US010582081B2

(12) United States Patent
Hiyama et al.

(10) Patent No.: US 10,582,081 B2
(45) Date of Patent: Mar. 3, 2020

(54) INFORMATION READING DEVICE AND METHOD OF ADJUSTING INFORMATION READING DEVICE

(71) Applicant: NIDEC SANKYO CORPORATION, Nagano (JP)

(72) Inventors: Chisato Hiyama, Nagano (JP); Masahiro Ikeda, Nagano (JP); Daigo Ogura, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 0 days.

(21) Appl. No.: 16/324,246

(22) PCT Filed: Aug. 8, 2017

(86) PCT No.: PCT/JP2017/028695
§ 371 (c)(1),
(2) Date: Feb. 8, 2019

(87) PCT Pub. No.: WO2018/030376
PCT Pub. Date: Feb. 15, 2018

(65) Prior Publication Data
US 2019/0174021 A1    Jun. 6, 2019

Related U.S. Application Data

(60) Provisional application No. 62/371,904, filed on Aug. 8, 2016.

(30) Foreign Application Priority Data

Jun. 28, 2017    (JP) .................................. 2017-126363

(51) Int. Cl.
*H04N 1/10*    (2006.01)
*H04N 1/028*    (2006.01)
(Continued)

(52) U.S. Cl.
CPC ............. *H04N 1/1056* (2013.01); *G02B 3/06* (2013.01); *H04N 1/00806* (2013.01);
(Continued)

(58) Field of Classification Search
None
See application file for complete search history.

(56) References Cited

U.S. PATENT DOCUMENTS

| 6,424,429 B1* | 7/2002 | Takahashi | .......... H04N 1/00204 358/1.16 |
| 2010/0309528 A1* | 12/2010 | Nacman | .................. H04N 1/40 358/444 |

(Continued)

FOREIGN PATENT DOCUMENTS

| JP | 56027169 A | 3/1981 |
| JP | 60214349 A | 10/1985 |

(Continued)

OTHER PUBLICATIONS

Nakauchi, Hiroaki, JP-10257245-A Publication (JP H09-059390 Application) English Translation, Image Reader, Abstract, Figs 1-4, par 0019-0044 (Year: 1998).*

(Continued)

*Primary Examiner* — Miya J Williams
(74) *Attorney, Agent, or Firm* — Cantor Colburn LLP

(57) ABSTRACT

An information reading may include an imaging element; a transparent placing member on which the information recording medium is placed; a first illuminator configured to irradiate a back side of the information recording medium placed on the placing member, with light; a second illuminator configured to irradiate a top side of the information recording medium placed on the placing member, with light; a first optical system configured to read information recorded on the back side of the information recording (Continued)

medium placed on the placing member; a second optical system configured to read information recorded on the top side of the information recording medium placed on the placing member; and an image-forming optical system configured to cause light passing through the first optical system to form an image onto the imaging element and cause light passing through the second optical system to form an image on the imaging element.

20 Claims, 13 Drawing Sheets

(51) Int. Cl.
    *H04N 1/107* (2006.01)
    *H04N 1/00* (2006.01)
    *G02B 3/06* (2006.01)

(52) U.S. Cl.
    CPC ....... *H04N 1/0283* (2013.01); *H04N 1/02815* (2013.01); *H04N 1/02835* (2013.01); *H04N 1/107* (2013.01)

(56) References Cited

U.S. PATENT DOCUMENTS

2015/0381846 A1* 12/2015 Shimizu ............ H04N 1/02815
                                                    358/474
2019/0166278 A1* 5/2019 Hiyama ............ H04N 1/00806

FOREIGN PATENT DOCUMENTS

| | | | |
|---|---|---|---|
| JP | 02090862 A | | 3/1990 |
| JP | 10257245 A | * | 9/1998 |
| JP | 10257245 A | | 9/1998 |
| JP | 2008042416 A | | 2/2008 |
| WO | 2006090860 A1 | | 8/2006 |

OTHER PUBLICATIONS

International Search Report corresponding to Application No. PCT/JP2017/028695; dated Oct. 3, 2017.

* cited by examiner

INFORMATION READING DEVICE AND METHOD OF ADJUSTING INFORMATION READING DEVICE

CROSS REFERENCE TO RELATED APPLICATIONS

This is the U.S. national stage of application No. PCT/JP2017/028695, filed on Aug. 8, 2017. Priority under 35 U.S.C. § 119(a) and 35 U.S.C. § 365(b) is claimed from Japanese Application No. 2017-126363, filed on Jun. 28, 2017; the disclosure of which is incorporated herein by reference. Priority under 35 U.S.C. § 119(e) is claimed from U.S. Provisional Application 62/371,904 filed on Aug. 8, 2016, the disclosure of which is incorporated herein by reference.

TECHNICAL FIELD

At least an embodiment of the present invention relates to an information reading device for optically reading information recorded on an information recording medium. Further, at least an embodiment of the present invention relates also to a method of adjusting such an information reading device.

BACKGROUND

Conventionally, known is an information reading device for optically reading information recorded on an information recording medium such as a passport or a card (see, for example, Patent Document 1). The information reading device described in Patent Document 1 is a manual reading device. The information reading device includes an image sensor configured to optically read information printed on one side of the information recording medium. The image sensor is attached to a frame unit forming a conveying path of the information recording medium.

Patent Document 1: WO2006/090860

The information recording medium includes an information recording medium in which image information on both sides of the information recording medium is required, such as an ID card. If the information on both sides of such an information recording medium is optically read by the information reading device described in Patent Document 1, it is necessary to perform a reading operation of reading information on one side of the information recording medium with the image sensor and a reading operation of reading the information on the other side of the information recording medium with the image sensor, and thus, the reading operation of the information recorded on the information recording medium becomes complicated.

Further, for example, if information on both sides of an ID card in which image information on both sides thereof is required is optically read by the information reading device described in Patent Document 1, an illegal act is possible where information on one side of the ID card is read with the image sensor, and then information on the other side of another person's ID card is read with the image sensor, so that the security is deteriorated.

SUMMARY

Therefore, at least an embodiment of the present invention provides an information reading device for optically reading information recorded on an information recording medium, the information reading device capable of simplifying an operation of reading the information and enhancing a security, even if information recorded on both sides of the information recording medium is read, and capable of simplifying a configuration.

In order to resolve the above problem, an information reading device of at least an embodiment of the present invention is an information reading device for optically reading information recorded on an information recording medium including: an imaging element, a transparent placing member on which the information recording medium is placed, a first illuminator configured to irradiate a back side of the information recording medium placed on the placing member, with light, a second illuminator configured to irradiate a top side of the information recording medium placed on the placing member, with light, a first optical system configured to read information recorded on the back side of the information recording medium placed on the placing member, a second optical system configured to read information recorded on the top side of the information recording medium placed on the placing member, and an image-forming optical system configured to cause the light passing through the first optical system to form an image onto an imaging element and cause the light passing through the second optical system to form an image on the imaging element.

The information reading device according to at least an embodiment of the present invention includes: a first illuminator configured to irradiate a back side of the information recording medium placed on the placing member, with light, a second illuminator configured to irradiate a top side of the information recording medium placed on the placing member, with light, a first optical system configured to read information recorded on the back side of the information recording medium placed on the placing member, a second optical system configured to read information recorded on the top side of the information recording medium placed on the placing member, and an image-forming optical system configured to cause the light passing through the first optical system to form an image onto an imaging element and cause the light passing through the second optical system to form an image on the imaging element.

Therefore, in at least an embodiment of the present invention, it is possible to optically read the information recorded on the both top and back sides of the information recording medium while the information recording medium is placed on the placing member. Therefore, according to at least an embodiment of the present invention, it is possible to simplify an operation of reading the information even if the information recorded on both sides of the information recording medium is read. In addition, since the information recorded on the both top and back sides of the information recording medium can be optically read in a state where the information recording medium is placed on the placing member, for example, it is possible to prevent an illegal act, for example, that the information on one side of the information recording medium is read with the imaging element, and then, the information on the other side of another person's information recording medium is read with the imaging element. Therefore, in at least an embodiment of the present invention, a security can be enhanced even if the information recorded on the both sides of the information recording medium is read.

Further, in at least an embodiment of the present invention, the information recorded on the both top and back sides of the information recording medium can be optically read by using one imaging element, so that as compared with a case where the imaging element configured to read the information recorded on the top side of the information recording medium and the imaging element configured to read the information recorded on the back side of the information recording medium are provided separately, it is possible to simplify the configuration of the information reading device In at least an embodiment of the present invention, the information reading device includes a beam splitter configured to cause a part of the light passing through one of the first optical system and the second optical system to transmit toward the image-forming optical system, and to reflect a part of the light passing through the other of the first optical system and the second optical system toward the image-forming optical system. With this configuration, it is possible to guide the light passing through the first optical system and the light passing through the second optical system to the image-forming optical system by using the fixed beam splitter, and thus, for example, as compared to a case where a reflection mirror is pivoted at a position at which the light passing through the first optical system is passed toward the image-forming optical system and at a position at which the light passing through the second optical system is reflected toward the image-forming optical system to guide the light passing through the first optical system and the light passing through the second optical system toward the image-forming optical system, it is possible to stabilize an optical path of the light heading toward the image-forming optical system. Therefore, it is possible to improve an accuracy in reading the information recorded on the information recording medium.

In at least an embodiment of the present invention, the information reading device includes a shutter mechanism configured to shield the light entering the beam splitter from the second optical system when the information recorded on the back side of the information recording medium placed on the placing member is read, and shield the light entering the beam splitter from the first optical system when the information recorded on the top side of the information recording medium placed on the placing member is read.

With this configuration, it is possible to eliminate an influence of ambient light reflected by the top side of the information recording medium when the information recorded on the back side of the information recording medium is read, and to eliminate an influence of ambient light reflected by the back side of the information recording medium when the information recorded on the top side of the information recording medium is read. Therefore, it is possible to further improve the accuracy in reading the information recorded on the information recording medium.

In at least an embodiment of the present invention, the shutter mechanism includes a shutter movable between a first light-shielding position for shielding the optical path between the first optical system and the beam splitter and a second light-shielding position for shielding the optical path between the second optical system and the beam splitter, and a shutter drive mechanism configured to move the shutter between the first light-shielding position and the second light-shielding position. With such a configuration, as compared with a case where the shutter configured to shield the optical path between the first optical system and the beam splitter and the shutter configured to shield the optical path between the second optical system and the beam splitter are provided separately, it is possible to simplify the configuration of the information reading device.

In at least an embodiment of the present invention, when the information recorded on the back side of the information recording medium placed on the placing member is read, the first illuminator irradiates the light while the second illuminator does not irradiate the light, and when the information recorded on the top side of the information recording medium placed on the placing member is read, the second illuminator irradiates the light while the first illuminator does not irradiate the light. With this configuration, when the information recorded on the back side of the information recording medium is read, it becomes possible to eliminate an influence of the light irradiated from the second illuminator and reflected by the top side of the information recording medium, and when the information recorded on the top side of the information recording medium is read, it becomes possible to eliminate an influence of the light irradiated from the first illuminator and reflected by the back side of the information recording medium. Therefore, it is possible to further improve the accuracy in reading the information recorded on the information recording medium.

In at least an embodiment of the present invention, an optical path length to the imaging element, of the light reflected by the back side of the information recording medium placed on the placing member, and an optical path length to the imaging element, of the light reflected by the top side of the information recording medium placed on the placing member, are substantially equal. With this configuration, it is possible to image the information on the back side of the information recording medium placed on the placing member and the information on the top side of the information recording medium placed on the placing member, at the same magnification.

In at least an embodiment of the present invention, the information reading device includes a camera arranged on a front side and a top side of the information reading device. With this configuration, for example, it is possible to photograph a face photo of an owner of the information recording medium performing an operation of reading the information recording medium. Therefore, for example, when the face photo information of the information recording medium read by the imaging element is checked with the face photo captured by the camera, it is possible to determine whether the owner of the information recording medium is a genuine owner.

Further, with such a configuration, when an operator holds a mobile terminal displaying a barcode or the like over the camera, it is possible to read the information displayed on the mobile terminal, for example.

In at least an embodiment of the present invention, the first optical system includes a reflection mirror placed below the placing member, the second optical system includes a reflection mirror placed above the information recording medium placed on the placing member, and at least one of the reflection mirror included in the first optical system and the reflection mirror included in the second optical system is adjustable in position in an optical path length direction of the light heading toward the imaging element after being reflected by the information recording medium placed on the placing member.

With such a configuration, even if it is possible to optically read the information recorded on the both top and back sides of the information recording medium with a single imaging element, it is possible to appropriately set the optical path length of the light heading toward the imaging element after being reflected by the back side of the information recording medium and the optical path length of the light heading toward the imaging element after being reflected by the top side of the information recording medium. That is, even if it is possible to optically read the information recorded on the both top and back sides of the information recording medium with a single imaging element, it is possible to appropriately set a focal position of light passing through the first optical system and the image-forming optical system and a focal position of light passing through the second optical system and the image-forming optical system. Therefore, That is, even if it is possible to optically read the information recorded on the both top and back sides of the information recording medium with a single imaging element, it is possible to improve an accuracy in reading the information recorded on the both top and back sides of the information recording medium.

It is noted that the "being adjustable in position in an optical path length direction of the light heading toward the imaging element after being reflected by the information recording medium placed on the placing member" as used herein means being adjustable in position so that the optical path length of the light heading toward the imaging element after being reflected by the information recording medium placed on the placing member can be changed.

In at least an embodiment of the present invention, the second optical system includes, as the reflection mirror, a first reflection mirror on which the light reflected by the top side of the information recording medium placed on the placing member enters, and a second reflection mirror on which the light reflected by the first reflection mirror enters, in which the reflection mirror included in the first optical system is fixed in a first optical path length direction being an optical path length direction of the light heading toward the imaging element after being reflected by the back side of the information recording medium placed on the placing member, at least one of the first reflection mirror and the second reflection mirror is adjustable in position in a second optical path length direction being an optical path length direction of the light heading toward the imaging element after being reflected by top side of the information recording medium placed on the placing member. With this configuration, since an position adjustment task of the reflection mirror included in the first optical system in the first optical path length direction is unnecessary, an adjustment task of the information reading device can be simplified.

In at least an embodiment of the present invention, the information reading device includes a mirror holding member configured to hold the first reflection mirror and the second reflection mirror, the mirror holding member is adjustable in position in a perpendicular direction, and the position of the mirror holding member is adjusted in the perpendicular direction, as a result of which the positions of the first reflection mirror and the second reflection mirror in the second optical path length direction is adjusted. With this configuration, it is possible to perform together the position adjustment task of the first reflection mirror and the position adjustment task of the second reflection mirror in the second optical path length direction, and thus, the position adjustment tasks of the first reflection mirror and the second reflection mirror in the second optical path length direction can be simplified.

In at least an embodiment of the present invention, the first reflection mirror is fixed to the mirror holding member while being inclined at a predetermined angle with respect to the perpendicular direction, and the second reflection mirror is attached to the mirror holding member so that an inclination angle of the second reflection mirror with respect to the perpendicular direction is adjustable. With this configuration, when the inclination angle of the second reflection mirror with respect to the perpendicular direction is adjusted, it is possible to adjust the position in the perpendicular direction of the light entering the imaging element after passing through the second optical system and the image-forming optical system.

For example, the information reading device of at least an embodiment of the present invention is adjusted by a method of adjusting an information reading device, the method including a first adjustment step of adjusting the imaging element in position in a rotation direction where an optical axis of the image-forming optical system serves as a rotation axis, adjusting the image-forming optical system and the imaging element in position in the perpendicular direction, and adjusting a focal point wherein a focal position of the light passing through the first optical system and the image-forming optical system is adjusted by adjusting the image-forming optical system in position in the optical axial direction of the image-forming optical system, and a second adjustment step, after the first adjustment step, of adjusting the mirror holding member in position in the perpendicular direction to adjust the first reflection mirror and the second reflection mirror in position in the second optical path length direction, and adjusting the inclination angle of the second reflection mirror with respect to the perpendicular direction. In this case, even if the second adjustment step is performed after the first adjustment step, there occur no deviation in the adjustment place adjusted in the first adjustment step. Therefore, even if it is possible to optically read the information recorded on the both top and back sides of the information recording medium with a single imaging element, the adjustment task of the information reading device can be simplified.

Effect of the Invention

As described above, in the information reading device of at least an embodiment of the present invention, even if the information recorded on both sides of the information recording medium is read, it is possible to simplify an operation of reading the information and enhance a security, and it is possible to simplify the configuration of the information reading device. Further, according to the method of adjusting the information reading device of at least an embodiment of the present invention, even if the information recorded on the both top and back sides of the information recording medium can be optically read by a single imaging element, an adjustment task of the information reading device can be simplified.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Next, at least an embodiment of the present invention will be described with reference to the drawings.

(Simplified Configuration of Information Reading Device)

Figure 1:
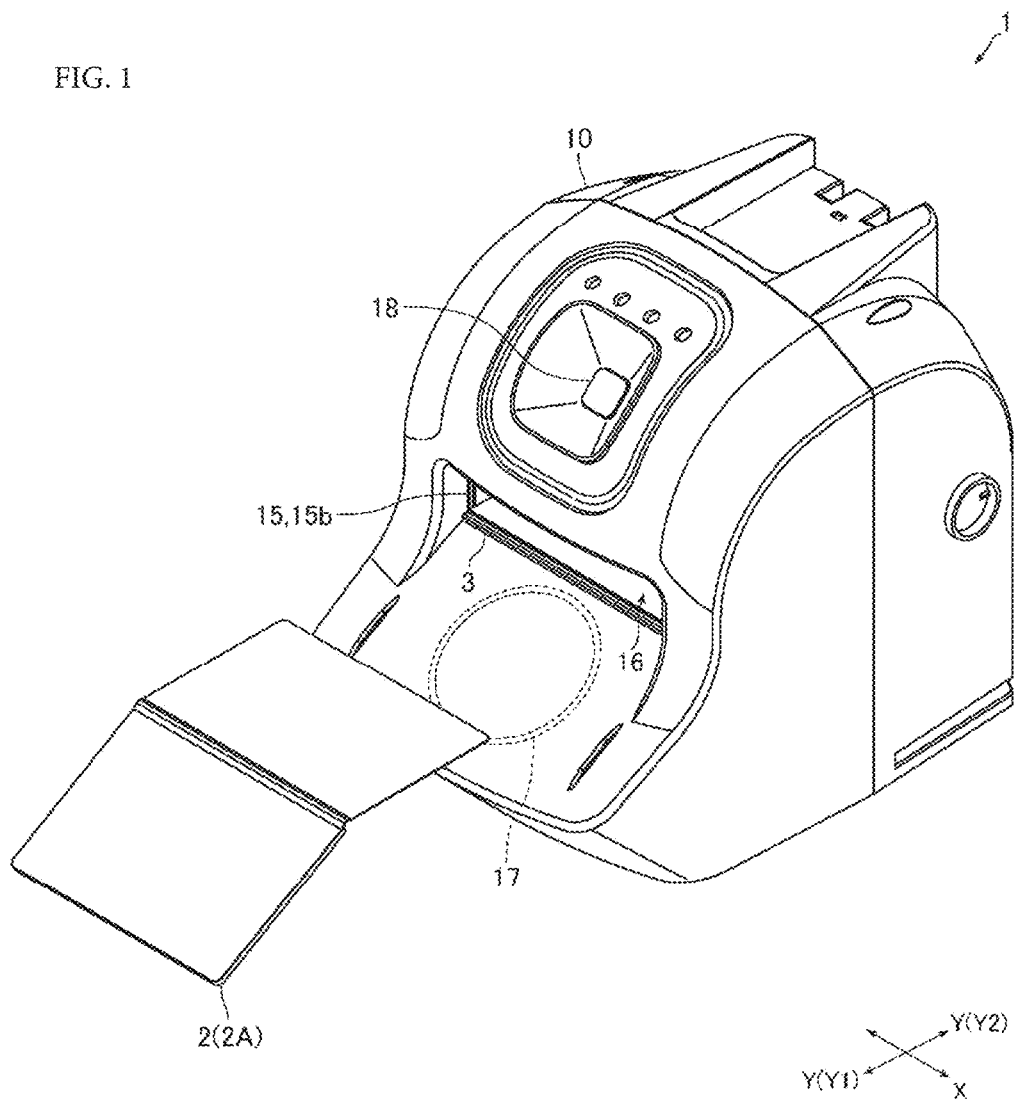
FIG. 1 is a perspective view of an information reading device according to an embodiment of the present invention.
Figure 2:
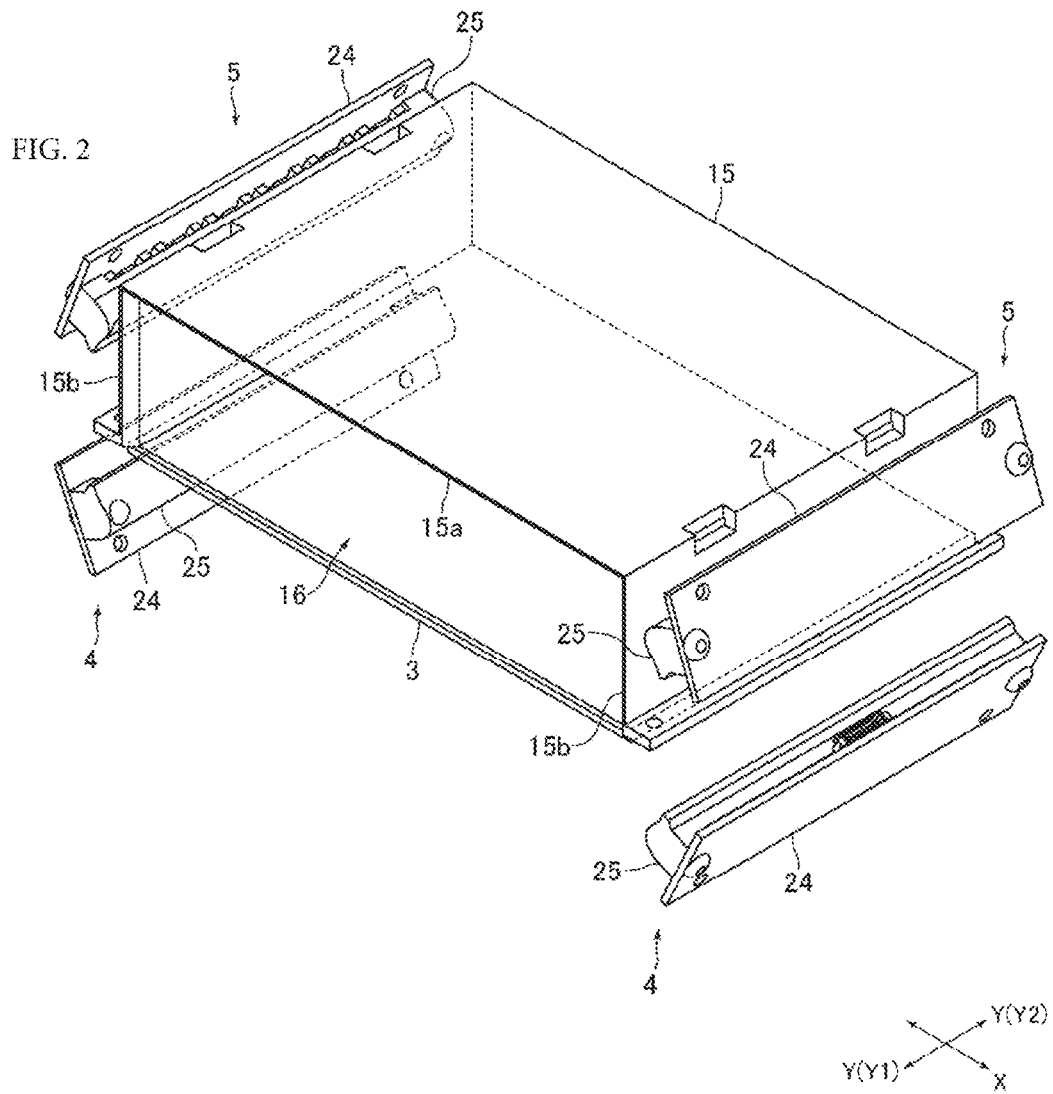
FIG. 2 is a perspective view where a placing member, a cover member, a first illuminator, and a second illuminator of the information reading device illustrated in FIG. 1 are extracted for illustration.
Figure 3A:
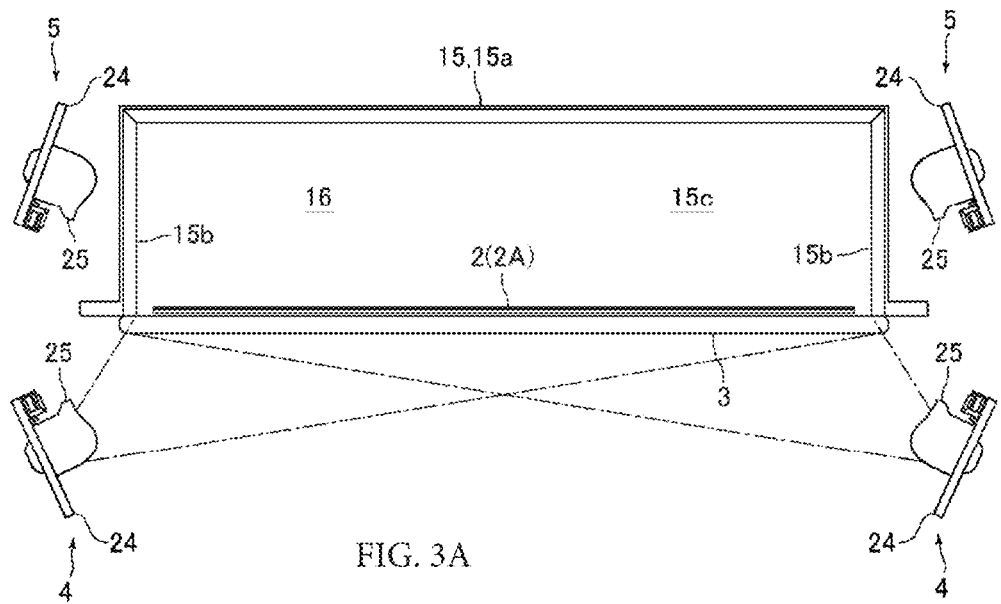
FIG. 3A and FIG. 3B are front views of the placing member, the cover member, the first illuminator, and the second illuminator illustrated in FIG. 2
Figure 3B:
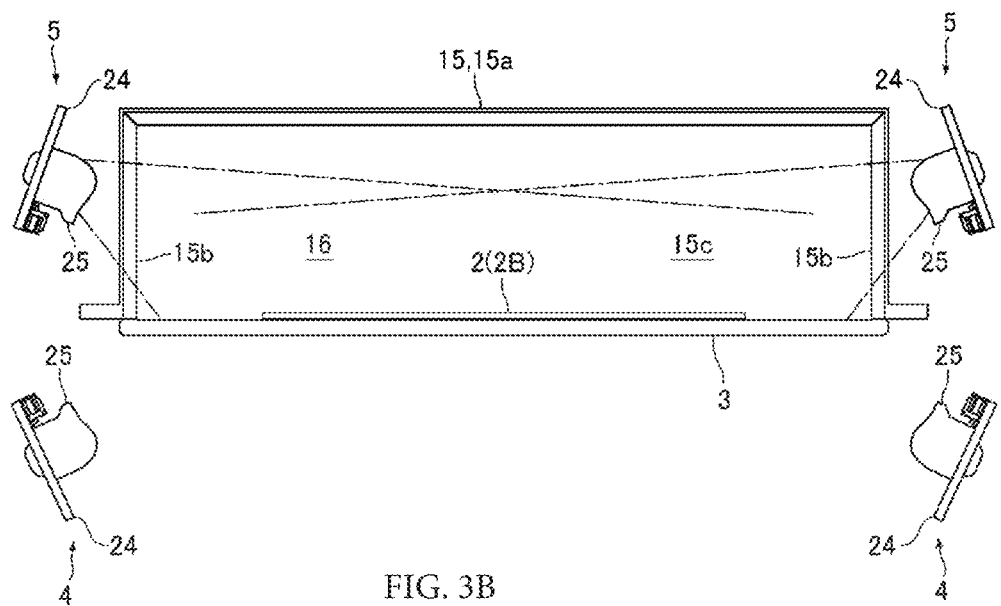
Figure 4:
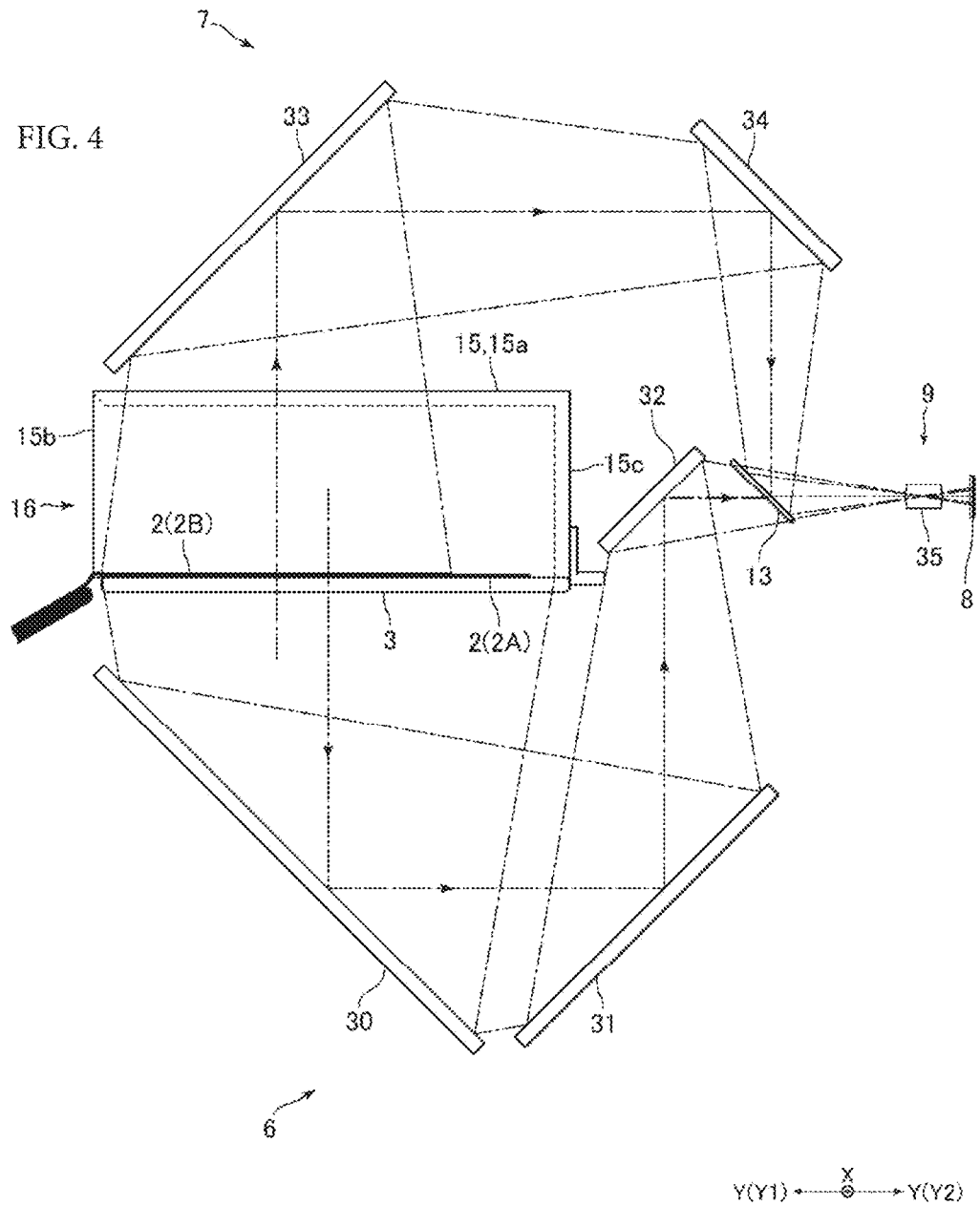
FIG. 4 is a side view for explaining an optical path inside the information reading device illustrated in FIG. 1.
Figure 5A:
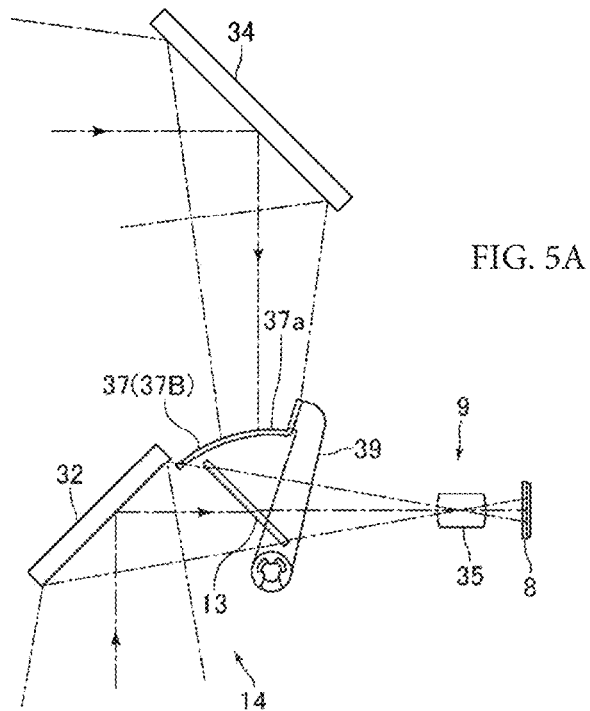
FIG. 5A and FIG. 5B are side views for explaining an operation of a shutter mechanism of the information reading device illustrated in FIG. 1.
Figure 5B:
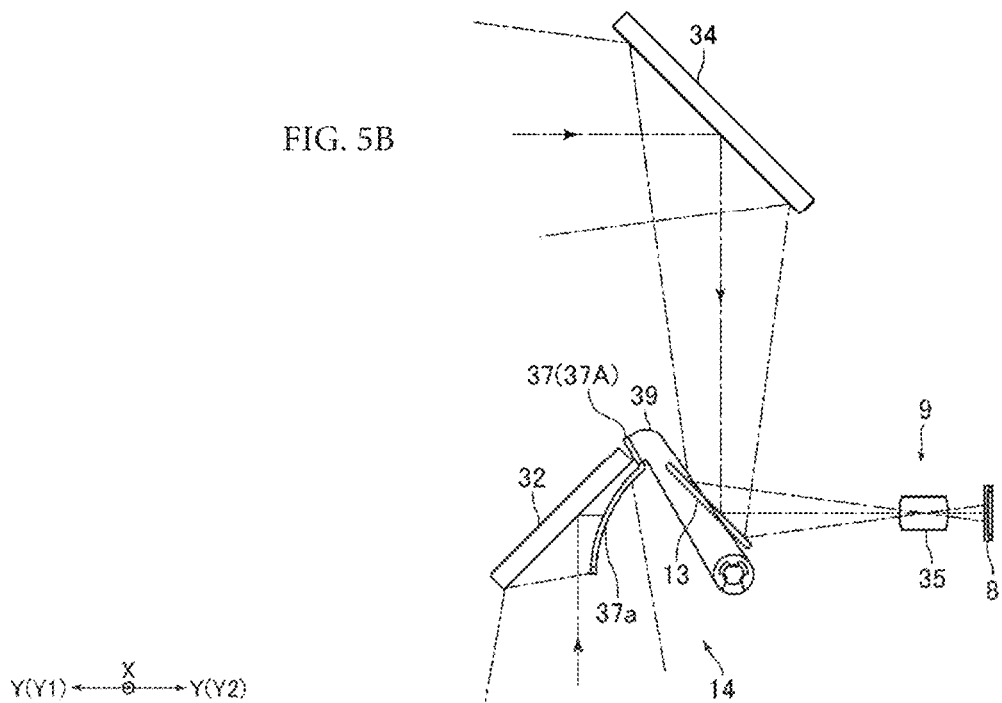

FIG. 1 is a perspective view of an information reading device 1 according to an embodiment of the present invention. FIG. 2 is a perspective view where a glass plate 3, a cover member 15, and illuminators 4, 5 of the information reading device 1 illustrated in FIG. 1 are extracted for illustration. FIG. 3A and FIG. 3B is a front view of the glass plate 3, the cover member 15, and the illuminators 4, 5 illustrated in FIG. 2. FIG. 4 is a side view for explaining an optical path inside the information reading device 1 illustrated in FIG. 1. FIG. 5A and FIG. 5B are a side view for explaining an operation of a shutter mechanism 14 of the information reading device 1 illustrated in FIG. 1.

The information reading device 1 in the present embodiment is a device configured to optically read information recorded on an information recording medium 2. That is, the information reading device 1 is a device configured to read a character, a graphic, or the like printed on the information recording medium 2. The information reading device 1 is a manual reading device, and insertion of the information recording medium 2 into the information reading device 1 and removal of the information recording medium 2 from the information reading device 1 are performed manually. Further, the information reading device 1 in the present embodiment is a relatively small desk-top type reading device. The information recording medium 2 read by the information reading device 1 is a passport 2A and an ID card 2B (see FIG. 3A and FIG. 3B). On the passport 2A and the ID card 2B, a face photo of an owner is printed.

If the information recording medium 2 is the passport 2A, information recorded on a rear surface of a front cover of the passport 2A is optically read by the information reading device 1. If the information recording medium 2 is the ID card 2B, information recorded on both sides of the ID card 2B are optically read by the information reading device 1. The passport 2A in the present embodiment is an IC passport and includes an IC chip and an IC page where an antenna for communication is built. Further, the ID card 2B is a non-contact type IC card, and in the ID card 2B, an IC chip and an antenna for communication are built. Further, the ID card 2B is formed in a rectangular shape.

The passport 2A, which is opened, is inserted into the information reading device 1. A thickness direction of the front cover of the opened passport 2A inserted into the information reading device 1 coincides with a perpendicular direction. In addition, a thickness direction of the ID card 2B inserted into the information reading device 1 coincides with the perpendicular direction.

In FIG. 4, for convenience of explanation, the passport 2A and the ID card 2B are inserted together into the information reading device 1, but in reality, either the passport 2A or the ID card 2B is inserted into the information reading device 1.

In the following description, it is assumed that a direction where the information recording medium 2 is inserted into the information reading device 1 (Y2 direction in FIG. 1 and the like) is a "far" side or a "rear" side, and a direction where the information recording medium 2 is removed from the information reading device 1 (Y1 direction in FIG. 1 and the like) is referred to as a "front" side. Further, a direction where the information recording medium 2 is inserted or removed relative to the information reading device 1 (Y direction in FIG. 1 and the like) is referred to as a "front-rear direction", and a direction orthogonal to the perpendicular direction and the front-rear direction (X direction in FIG. 1 and the like) is referred to as a "left-right direction".

The information reading device 1 includes a transparent glass plate 3 on which the information recording medium 2 is placed, an illuminator 4 configured to irradiate a back side of the information recording medium 2 placed on the glass plate 3, with light, an illuminator 5 configured to irradiate a top side of the information recording medium 2 placed on the glass plate 3, with light, an optical system 6 configured to read information recorded on the back side of the information recording medium 2 placed on the glass plate 3, an optical system 7 configured to read information recorded on the top side of the information recording medium 2 placed on the glass plate 3, an imaging element 8, an image-forming optical system 9 configured to cause the light passing through the optical system 6 to form an image onto the imaging element 8 and cause the light passing through the optical system 7 to form an image on the imaging element 8, and a housing 10 where these components are housed. The imaging element 8 is a two-dimensional CMOS image sensor or a CCD image sensor. The glass plate 3 in the present embodiment is a placing member, the illuminator 4 is a first illuminator, and the illuminator 5 is a second illuminator. Further, the optical system 6 is a first optical system, and the optical system 7 is a second optical system.

In addition, the information reading device 1 includes a beam splitter 13 configured to transmit a part of the light passing through the optical system 6 toward the imaging optical system 9 and to reflect a part of the light passing through the optical system 7 toward the image-forming optical system 9, and a shutter mechanism 14 configured to shield the light entering the beam splitter 13 from the optical system 7 when the information recorded on the back side of the information recording medium 2 placed on the glass plate 3 is read, and shield the light entering the beam splitter 13 from the optical system 6 when the information recorded on the top side of the information recording medium 2 placed on the glass plate 3 is read. The beam splitter 13 and the shutter mechanism 14 are housed in the housing 10.

Further, the information reading device 1 includes the cover member 15 having a top surface 15a placed above the information recording medium 2 placed on the glass plate 3, two side surfaces 15b connecting to both left and right end sides of the top surface 15a, and a far surface 15c connecting to a far end side of the top surface 15a. The cover member 15 in the present embodiment includes the top surface 15a, the two side surfaces 15b, and the far surface 15c. The cover member 15 is made of a transparent resin. For example, the cover member 15 is made of a transparent acrylic resin. For example, a light-shielding coating is applied to the far surface 15c, and the far surface 15c serves as a light shielding unit configured to shield light. On the other hand, the top surface 15a and the side surfaces 15b are transparent.

The top surface 15a is formed in a rectangular flat plate shape and is arranged so that a thickness direction of the top surface 15a coincides with a perpendicular direction. Further, the top surface 15a is arranged so that an end surface of the top surface 15a is parallel to the front-rear direction or the left-right direction. The side surfaces 15b are each formed in a rectangular flat plate shape and are arranged so that the thickness direction of the side surfaces 15b coincides with a left-right direction. The far surface 15c is formed in a rectangular flat plate shape and is arranged so that a thickness direction of the far surface 15c coincides with the front-rear direction. Both left and right ends of the far surface 15c are connected to a far end of the side surfaces 15b.

The glass plate 3 is formed in a rectangular flat plate shape and arranged so that a thickness direction of the glass plate 3 coincides with a perpendicular direction. Further, the glass plate 3 is arranged such that an end surface of the glass plate 3 is parallel to the front-rear direction or the left-right direction. Lower ends of the side surfaces 15b and a lower end of the far surface 15c are in contact with the top side of the glass plate 3. In the present embodiment, the glass plate 3 and the cover member 15 form a box-like medium arrangement unit 16 of which the front surface is opened and which is configured to contain at least a part of the information recording medium 2. As illustrated in FIG. 1, except for the opening at the front side, the medium arrangement unit 16 is covered with the housing 10.

On the glass plate 3, the entire ID card 2B is placed. That is, the entire ID card 2B is placed in the medium arrangement unit 16. Further, a part of the passport 2A is placed on the glass plate 3 so that a spine of the opened passport 2A is arranged at a front end side of the glass plate 3. That is, a part of the passport 2A is arranged in the medium arrangement unit 16. Further, the passport 2A is placed on the glass plate 3 so that the rear surface of the cover on which personal information is recorded faces downward. In the present embodiment, a width in the front-rear direction of the ID card 2B placed on the glass plate 3 is narrower than a width in the front-rear direction of a portion where the passport 2A is placed on the glass plate 3. Further, a width in the left-right direction of the ID card 2B placed on the glass plate 3 is narrower than a width in the left-right direction of the passport 2A.

Below the glass plate 3, an antenna (not illustrated) configured to communicate with a communication antenna built in the ID card 2B is arranged. The antenna is arranged at a position where no problem is generated when the information on the back side of the information recording medium 2 placed on the glass plate 3 is optically read. As illustrated in FIG. 1, at a farther front side from the glass plate 3, an antenna 17 configured to communicate with a communication antenna built in the passport 2A is arranged. The antenna 17 is arranged below the glass plate 3. According to some specifications of the passport 2A, communication between the antenna arranged below the glass plate 3 and the antenna built in the passport 2A may be performed.

Further, as illustrated in FIG. 1, the information reading device 1 includes a camera 18 arranged at the front side and the upper side of the information reading device 1. The camera 18 is arranged above the medium arrangement unit 16. An optical axis of the camera 18 is gradually inclined upward toward a front side. For example, the camera 18 photographs a face of a person performing an operation of reading the information recording medium 2.

(Configuration and Arrangement of Illuminator)

The illuminators 4 and 5 include a substrate 24 on which a plurality of light sources are mounted, and an illumination lens 25 on which light emitted from the light source enters. The light sources of the illuminators 4 and 5 in the present embodiment include a plurality of white LEDs for emitting white light, a plurality of infrared LEDs for emitting infrared light, and a plurality of ultraviolet LEDs for emitting ultraviolet light. The substrate 24 is formed in an elongated rectangular flat plate shape. The illumination lens 25 is formed in an elongated substantially rectangular parallelepiped shape. The illumination lens 25 is fixed on a surface of the substrate 24 to which the light source is mounted.

The illumination lens 25 receives the white light emitted from the white LEDs, the infrared light emitted from the infrared LEDs, and the ultraviolet light emitted from the ultraviolet LEDs, and the information recording medium 2 is irradiated with the light passing through the illumination lens 25. It is noted that the infrared light beams irradiated from the illuminators 4 and 5 are used for reading machine-readable printing information such as an OCR character. The ultraviolet light beams irradiated from the illuminators 4 and 5 are used for reading printing information necessary for an authenticity determination of the information recording medium 2. Specifically, the ultraviolet light beams irradiated from the illuminators 4 and 5 are used for reading information printed with an invisible fluorescent coloring ink.

As illustrated in FIG. 3A and FIG. 3B, the illuminators 4 are arranged below the glass plate 3. Further, the information reading device 1 includes the two illuminators 4, and the illuminators 4 are each arranged on both outer sides of the glass plate 3 in the left-right direction. The illuminators 4 illuminate the information recording medium 2 placed on the glass plate 3 from outside in the left-right direction and from an obliquely lower side. Further, the back side of the information recording medium 2 placed on the glass plate 3 is irradiated with the light beams emitted from the illuminators 4 and transmitted through the glass plate 3.

The illuminators 5 are arranged above the information recording medium 2 placed on the glass plate 3. In addition, the information reading device 1 includes two illuminators 5, and the illuminators 5 are each arranged on both outer sides of the medium arrangement unit 16 in the left-right direction. That is, one illuminator 5 out of the two illuminators 5 is arranged at a right side of the side surface unit 15b arranged at a right side, and the other illuminator 5 out of the two illuminators 5 is arranged at a left side of the side surface unit 15b arranged at a left side. The illuminators 5 illuminate the information recording medium 2 placed on the glass plate 3 from outside in the left-right direction and from an obliquely upper side. Further, the top side of the information recording medium 2 placed on the glass plate 3 is irradiated with the light beams emitted from the illuminators 5 and transmitted through the side surfaces 15b.

(Configuration and Arrangement of Optical System, Image-Forming Optical System, Beam Splitter, and Imaging Element)

The optical system 6 includes three reflection mirrors (total reflection mirrors) 30, 31, 32 formed in a rectangular flat plate shape. The reflection mirror 30 is larger than the reflection mirror 31, and the reflection mirror 31 is larger than the reflection mirror 32. The reflection mirrors 30 and 31 are arranged below the glass plate 3. Specifically, the reflection mirror 30 is arranged below the passport 2A placed on the glass plate 3. Further, the reflection mirror 31 is arranged at substantially the same height as the reflection mirror 30, and is arranged in the rearward of the reflection mirror 30. The reflection mirror 32 is arranged behind the medium arrangement unit 16. Further, the reflection mirror 32 is arranged above the reflection mirror 31.

The reflection mirrors 30 to 32 are arranged while being inclined at a predetermined angle with respect to the perpendicular direction.
Specifically, as illustrated in FIG. 4, the reflection mirrors 30 to 32 are arranged while being inclined at a predetermined angle with respect to the perpendicular direction when viewed from the left-right direction. The reflection mirror 30 is gradually inclined downward toward a rear side, and the reflection mirrors 31, 32 are gradually inclined upward toward a rear side. Inclination angles of the reflection mirrors 30 to 32 with respect to the perpendicular direction are approximately 45°.

The reflection mirror 30 receives light reflected by the back side of the information recording medium 2 placed on the glass plate 3. The reflection mirror 31 receives light reflected by the reflection mirror 30, and the reflection mirror 32 receives light reflected by the reflection mirror 31. In the reflection mirror 30, an optical axis of the light heading downward after being reflected by the back side of the information recording medium 2 is bent rearward. Further, in the reflection mirror 31, an optical axis of the light heading rearward after being reflected by the reflection mirror 30 is bent upward, and in the reflection mirror 32, an optical axis of the light heading upward after being reflected by the reflection mirror 31 is bent rearward.

The optical system 7 includes two reflection mirrors (total reflection mirrors) 33, 34 formed in a rectangular flat plate shape. The reflection mirror 33 is larger than the reflection mirror 34. The reflection mirrors 33, 34 are arranged above the information recording medium 2 placed on the glass plate 3. Specifically, the reflection mirror 33 is arranged above the ID card 2B placed on the glass plate 3. Further, the reflection mirror 34 is arranged at substantially the same height as the reflection mirror 33, and is arranged in the rearward of the glass plate 3 (that is, in the rearward of the medium arrangement unit 16). Further, the reflection mirrors 33, 34 are arranged above the top surface 15a of the cover member 15 (that is, above the medium arrangement unit 16).

The reflection mirrors 33, 34 are arranged while being inclined at a predetermined angle with respect to the perpendicular direction. Specifically, as illustrated in FIG. 4, the reflection mirrors 33, 34 are arranged while being inclined at a predetermined angle with respect to the perpendicular direction when viewed from the left-right direction. The reflection mirror 33 is gradually inclined upward toward a rear side, and the reflection mirrors 34 is gradually inclined downward toward a rear side. Inclination angles of the reflection mirrors 33, 34 with respect to the perpendicular direction are approximately 45°.

The reflection mirror 33 receives light reflected by the top side of the information recording medium 2 placed on the glass plate 3. The reflection mirror 34 receives light reflected by the reflection mirror 33. In the reflection mirror 33, an optical axis of the light heading upward after being reflected by the top side of the information recording medium 2 is bent rearward, and in the reflection mirror 34, an optical axis of the light heading rearward after being reflected by the reflection mirror 33 is bent downward. The reflection mirror 33 in the present embodiment is a first reflection mirror and the reflection mirror 34 is a second reflection mirror.

The image-forming optical system 9 includes an image-forming lens 35. The image-forming lens 35 is arranged rearward of the reflection mirror 32. Further, the image-forming lens 35 is arranged in the rearward of the reflection mirror 34. The imaging element 8 is arranged rearward of the image-forming lens 35. The imaging element 8 is arranged so that an imaging surface of the imaging element 8 faces the front side.

The beam splitter 13 is formed in a rectangular flat plate shape. The beam splitter 13 in the present embodiment is a half mirror having an equal light transmittance and reflectance. The beam splitter 13 is arranged, in the front-rear direction, between the reflection mirror 32 and the image-forming lens 35. That is, the beam splitter 13 is arranged behind the reflection mirror 32 and in front of the image-forming lens 35. Further, the beam splitter 13 is arranged below the reflection mirror 34.

The beam splitter 13 is arranged while being inclined at a predetermined angle with respect to the perpendicular direction. More specifically, as illustrated in FIG. 4, the beam splitter 13 is arranged while being inclined at a predetermined angle with respect to the perpendicular direction when viewed from the left-right direction. The beam splitter 13 is gradually inclined downward toward a rear side. An inclination angle of the beam splitter 13 with respect to the perpendicular direction is approximately 45°. The beam splitter 13 transmits half the light reflected by the reflection mirror 32 toward the image-forming lens 35 and reflects half the light reflected by the reflection mirror 34 toward the image-forming lens 35.

In the present embodiment, an optical path length of the light reflected by the back side of the information recording medium 2 placed on the glass plate 3 up to the imaging element 8 and an optical path length of the light reflected by the top side of the information recording medium 2 placed on the glass plate 3 up to the imaging element 8 are substantially equal.

(Configuration of Shutter Mechanism)

Figure 6:
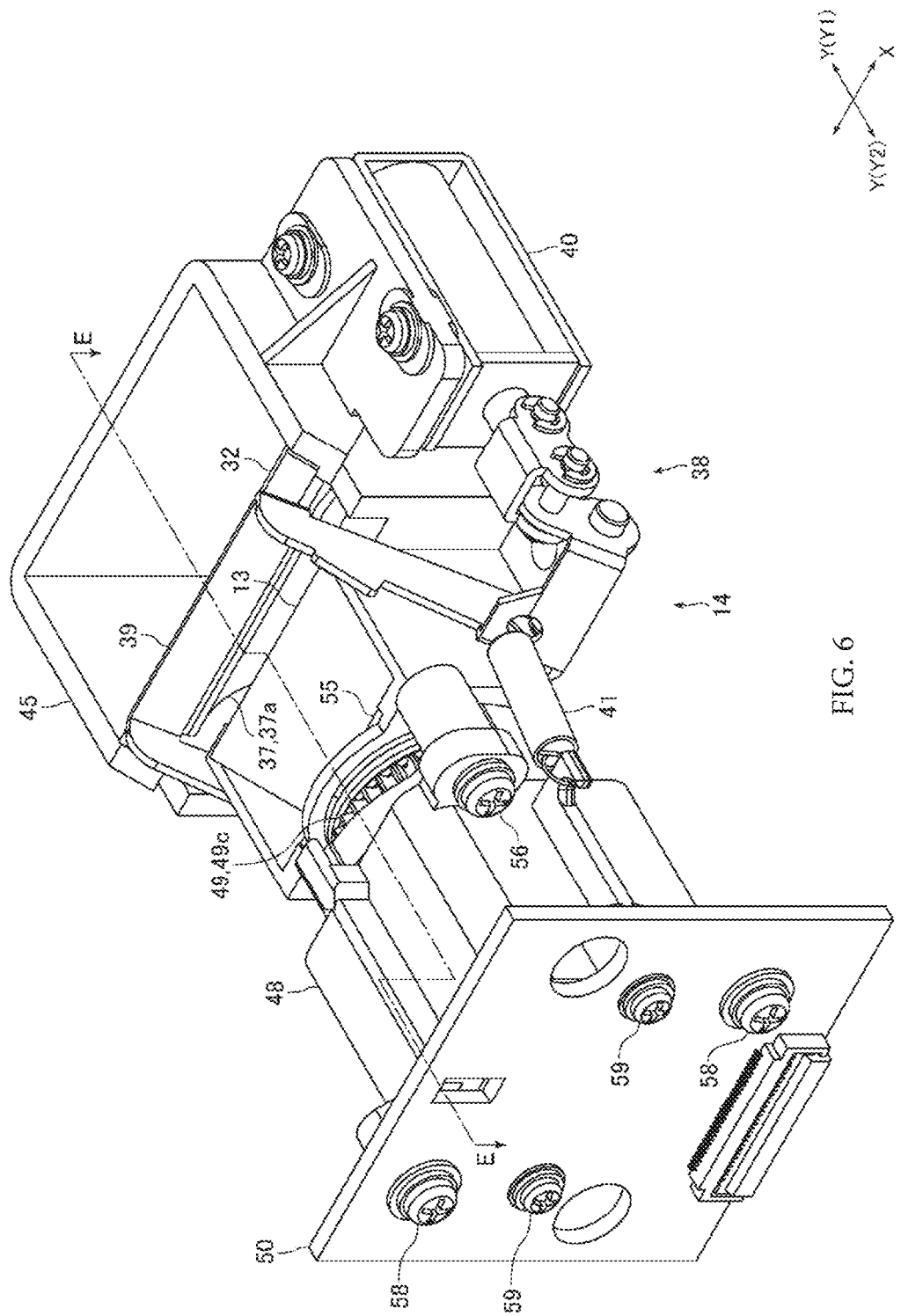
FIG. 6 is a perspective view for explaining a configuration of the shutter mechanism illustrated in FIG. 5A and FIG. 5B.

FIG. 6 is a perspective view for explaining a configuration of the shutter mechanism 14 illustrated in FIG. 5A and FIG. 5B.

The shutter mechanism 14 includes a shutter 37 movable between a first light-shielding position 37A (see FIG. 5B) for shielding the optical path between the optical system 6 and the beam splitter 13 (that is, the optical path between the reflection mirror 32 and the beam splitter 13), and a second light-shielding position 37B (see FIG. 5A) for shielding the optical path between the optical system 7 and the beam splitter 13 (that is, the optical path between the reflection mirror 34 and the beam splitter 13). In addition, the shutter mechanism 14 includes a shutter drive mechanism 38 configured to move the shutter 37 between the first light-shielding position 37A and the second light-shielding position 37B.

As illustrated in FIG. 6, the shutter drive mechanism 38 includes a lever member 39 to which the shutter 37 is fixed, a solenoid 40 configured to pivot the lever member 39, and a tension coil spring 41 configured to bias the lever member 39 to one side in a direction where the lever member 39 pivots. The solenoid 40 is fixed to a fixing frame 45 described later to which the reflection mirror 32 and the like are fixed. A lower end of the lever member 39 is held pivotably by the fixing frame 45. The lever member 39 is pivotable with the left-right direction being an axial direction in pivoting. The shutter 37 is fixed to an upper end of the lever member 39.

The shutter 37 includes a light shielding unit 37a configured to shield the optical path between the reflection mirrors 32 and 34 and the beam splitter 13. The light shielding unit 37a is formed in a curved plate shape having a circular arc shape when viewed from the left-right direction. A center of curvature of the light shielding unit 37a when viewed from the left-right direction substantially coincides with the pivoting center of the lever member 39. The shutter 37 is biased toward the second light-shielding position 37B by a biasing force of the tension coil spring 41. When the solenoid 40 is not energized, the shutter 37 is arranged at the second light-shielding position 37B, and when the solenoid 40 is energized, the shutter 37 moves to the first light-shielding position 37A.

(Attachment Structure of Optical System, Image-Forming Optical System, Beam Splitter, and Imaging Element)

Figure 7:
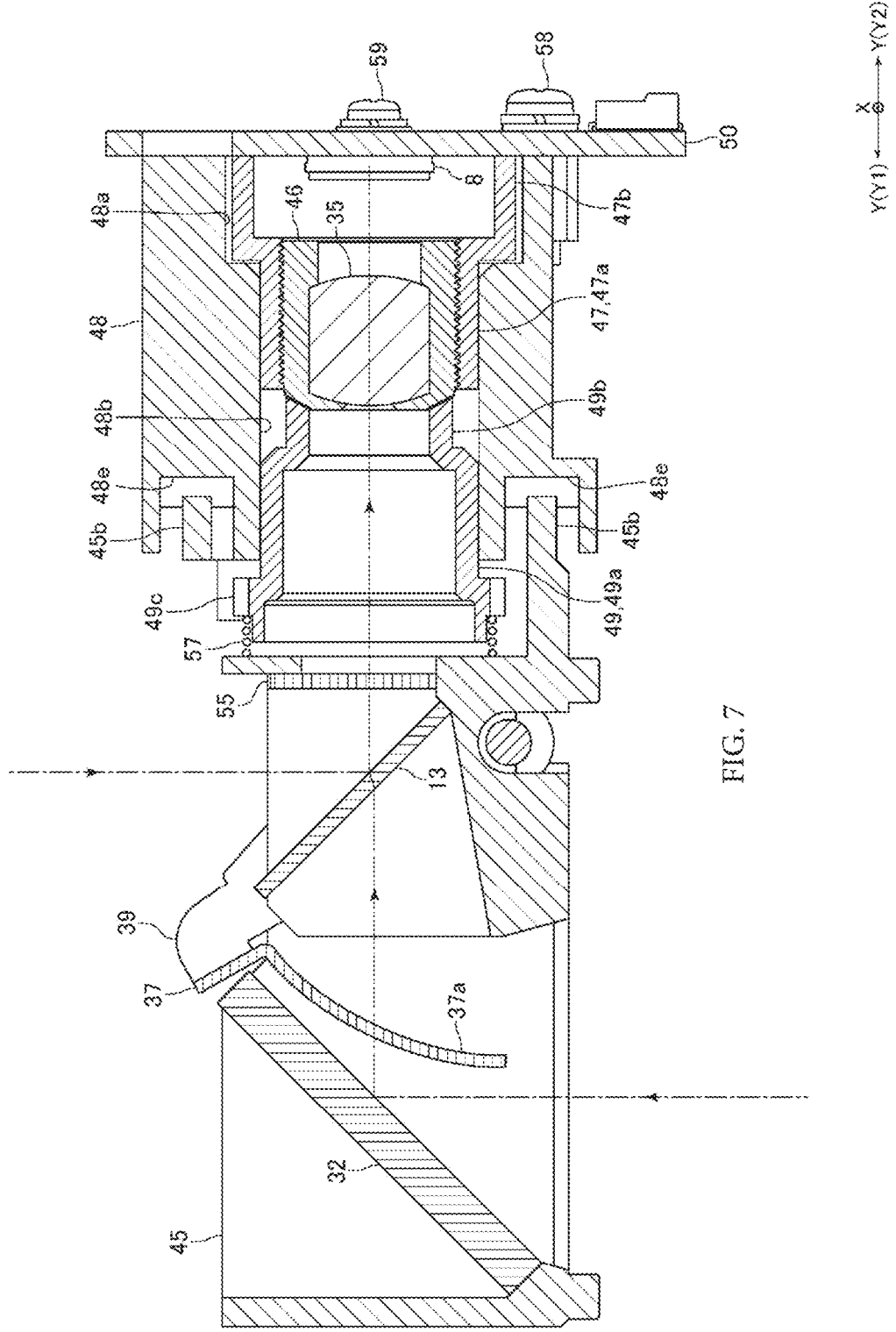
FIG. 7 is a cross-sectional view taken along E-E in FIG. 6.
Figure 8:
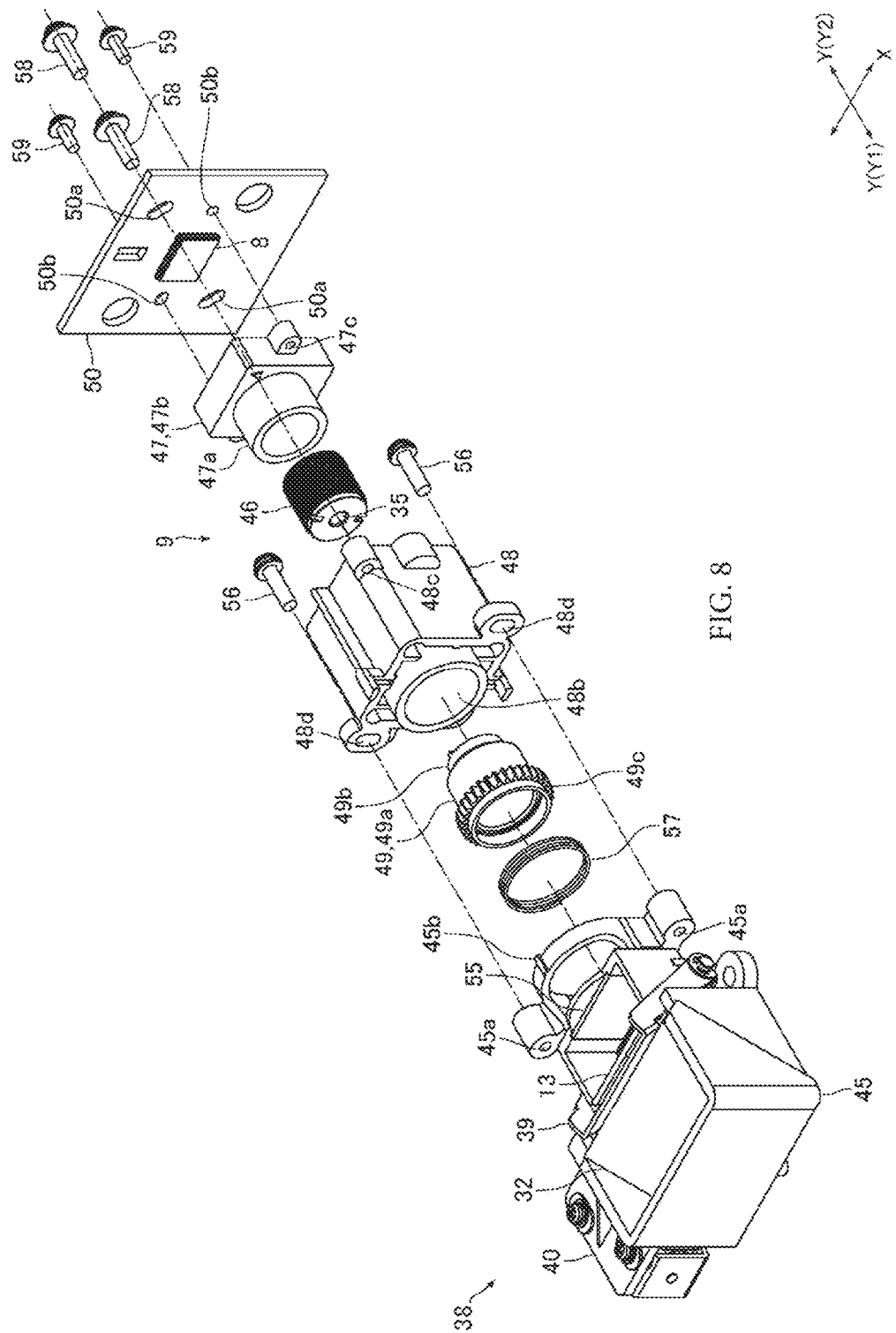
FIG. 8 is an exploded perspective view of a fixed frame, a holding frame, a substrate, and the like illustrated in FIG. 6.
Figure 9:
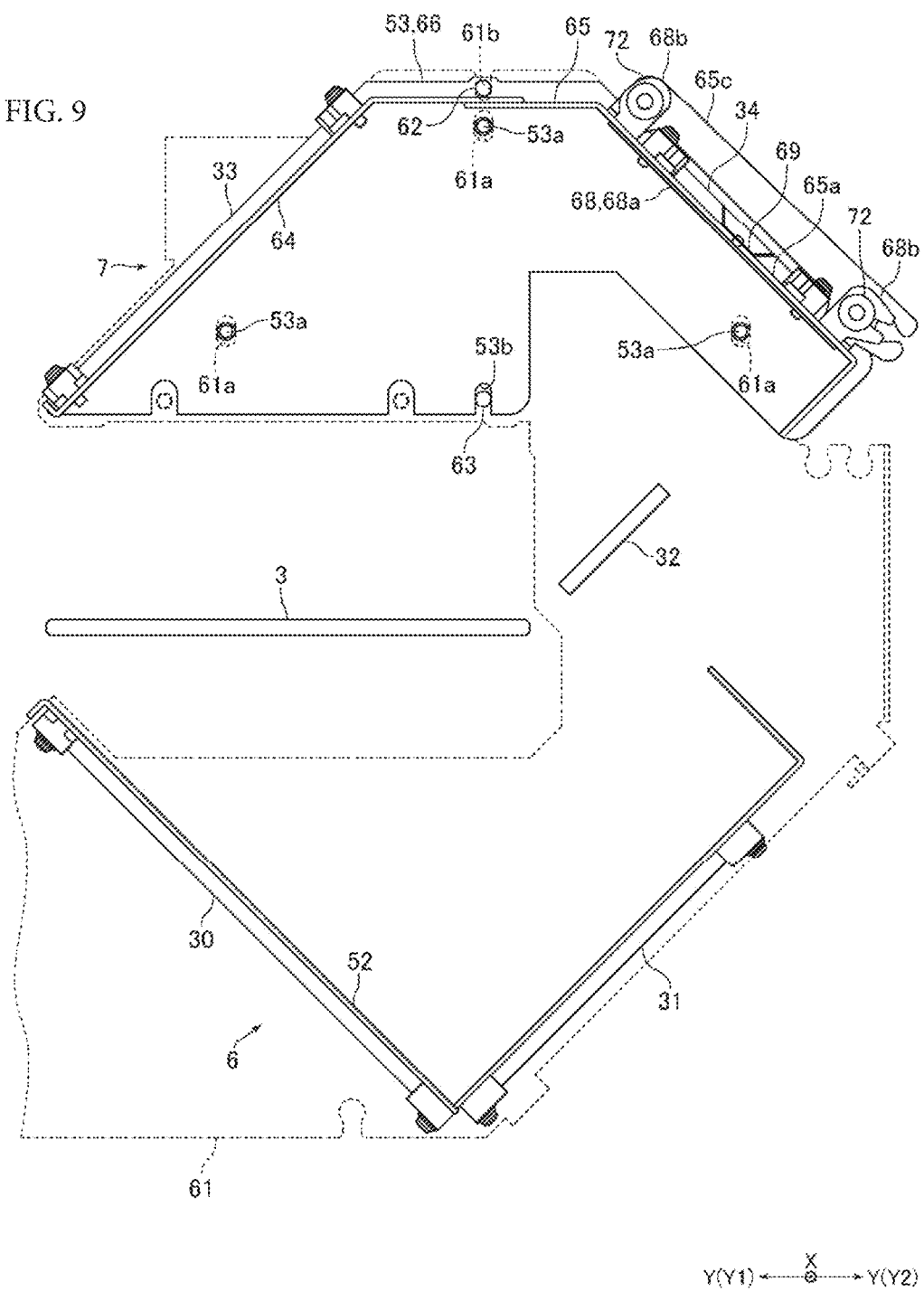
FIG. 9 is a side view for explaining an attachment structure of a reflection mirror illustrated in FIG. 4.
Figure 10:
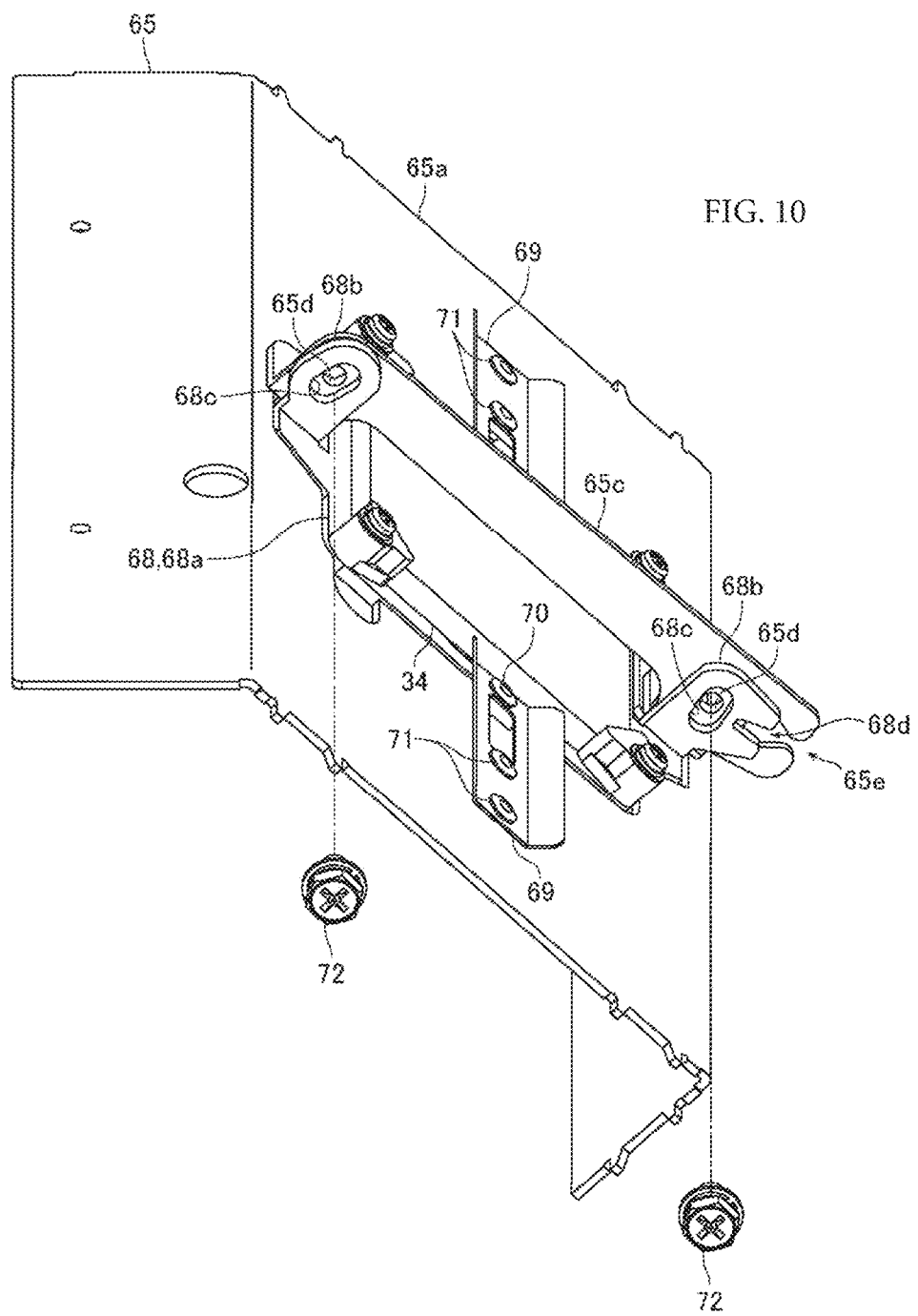
FIG. 10 is a perspective view of an attaching portion of the second reflection mirror illustrated in FIG. 9.
Figure 11:
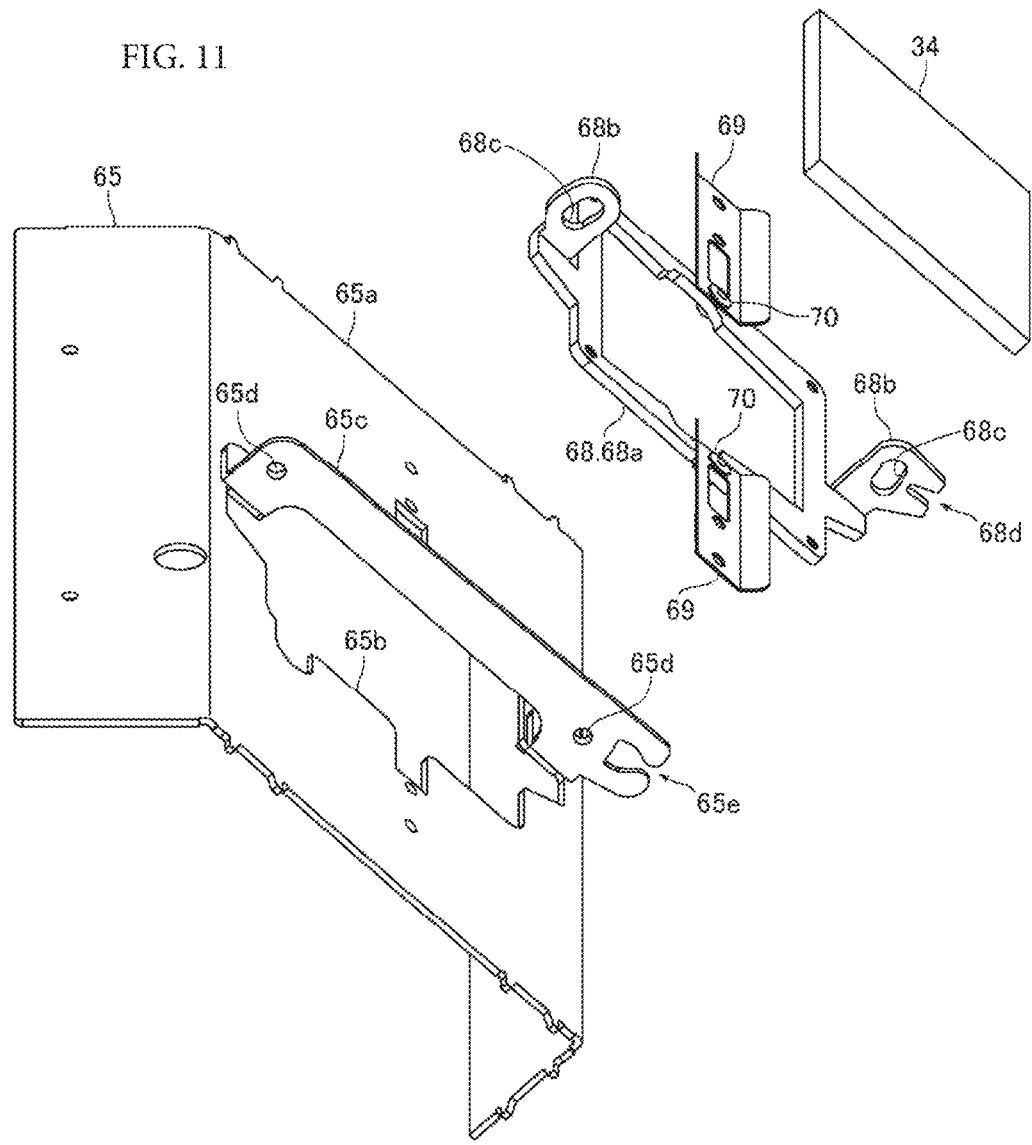
FIG. 11 is an exploded perspective view of the attaching portion of the second reflection mirror illustrated in FIG. 10.
Figure 12:
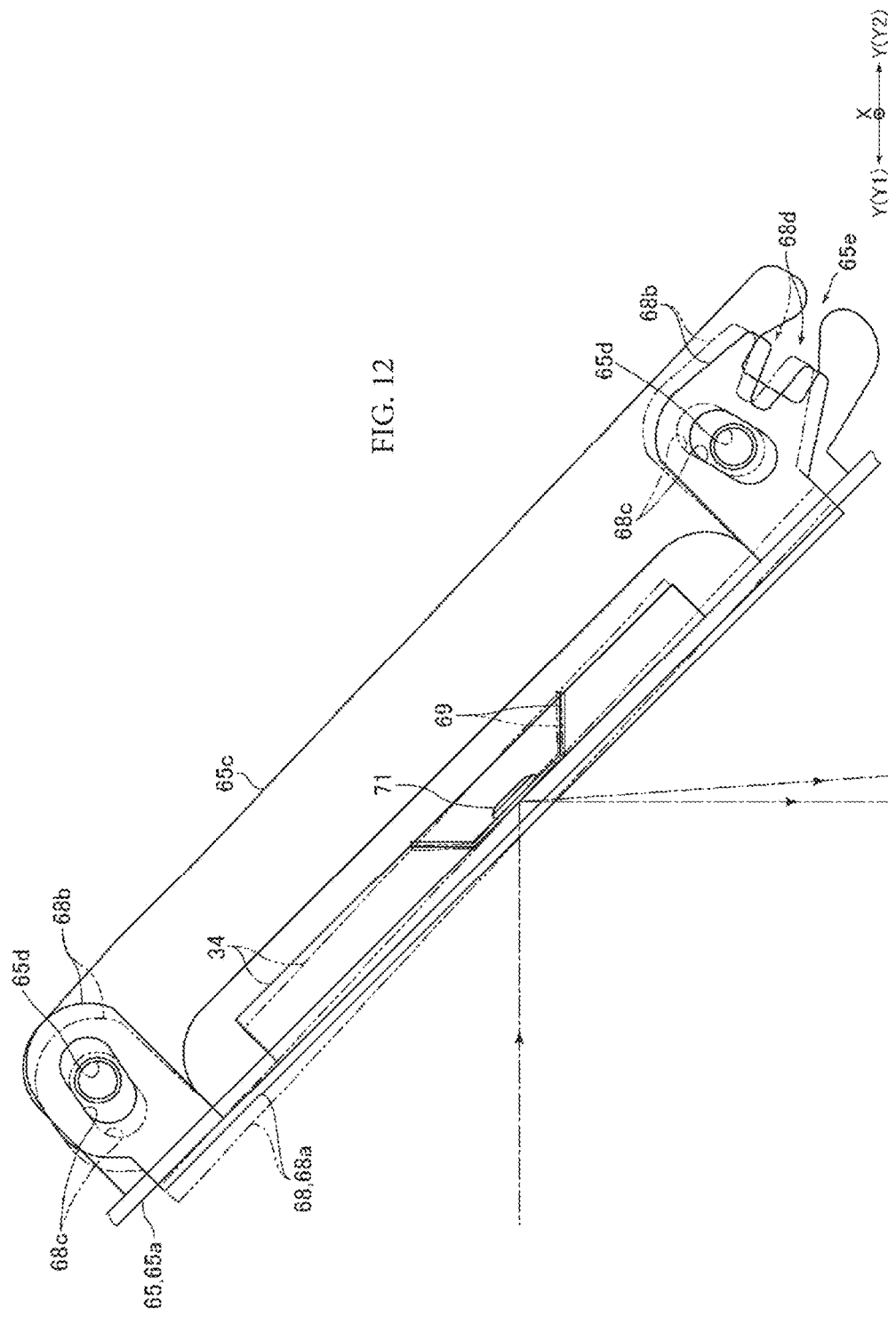
FIG. 12 is a side view for explaining a configuration of the attaching portion of the second reflection mirror illustrated in FIG. 10.

FIG. 7 is a cross-sectional view taken along E-E in FIG. 6. FIG. 8 is an exploded perspective view of the fixing frame 45, the holding frame 48, the substrate 50, and the like illustrated in FIG. 6. FIG. 9 is a side view for explaining an attachment structure of the reflection mirrors 30, 31, 33, and 34 illustrated in FIG. 4. FIG. 10 is a perspective view of an attaching portion of the reflection mirror 34 illustrated in FIG. 9. FIG. 11 is an exploded perspective view of the attaching portion of the reflection mirror 34 illustrated in FIG. 10. FIG. 12 is a side view for explaining a configuration of an attaching portion of the reflection mirror 34 illustrated in FIG. 10.

As illustrated in FIG. 6 to FIG. 8, the information reading device 1 includes the fixing frame 45 to which the reflection mirror 32 and the beam splitter 13 are fixed, a lens barrel 46 to which the image-forming lens 35 is fixed, a barrel holder 47 configured to hold the lens barrel 46, a holding frame 48 configured to hold the barrel holder 47, an adjustment ring 49 configured to rotate the lens barrel 46 with respect to the barrel holder 47, and the substrate 50 on which the imaging element 8 is mounted. Further, as illustrated in FIG. 9, the information reading device 1 includes a lower frame 52 configured to hold the reflection mirrors 30, 31, and an upper frame 53, serving as a mirror holding member, configured to hold the reflection mirrors 33, 34. These configurations are housed in the housing 10.

The fixing frame 45 is arranged rearward of the cover member 15. The fixing frame 45 is fixed to the housing 10 directly or via a predetermined member. The reflection mirror 32 and the beam splitter 13 are fixed by adhesion to the fixing frame 45. Further, an ultraviolet cut filter 55 is fixed by adhesion to the fixing frame 45. The ultraviolet cut filter 55 is arranged rearward of the beam splitter 13. At a rear end side of the fixing frame 45, two screw holes 45 configured to fix the holding frame 48 are formed (see FIG. 8). At the rear end side of the fixing frame 45, two convex portions 45b are formed which engage with below-described guide grooves 48e formed on the holding frame 48.

The lens barrel 46 is formed in a cylindrical shape. The lens barrel 46 is arranged so that an axial direction of the lens barrel 46 coincides with the front-rear direction. The image-forming lens 35 is fixed on an inner peripheral surface of the lens barrel 46. On an outer peripheral surface of the lens barrel 46, a male screw is formed.

The barrel holder 47 is formed in a tubular shape. The barrel holder 47 includes a barrel holding unit 47a configured to hold the lens barrel 46 and a substrate fixing unit 47b to which the substrate 50 is fixed. The barrel holding unit 47a is formed in a cylindrical shape. The barrel holding unit 47a is arranged so that an axial direction of the barrel holding unit 47a coincides with the front-rear direction. On an inner peripheral surface of the barrel holding unit 47a, a female screw is formed into which the male screw of the outer peripheral surface of the lens barrel 46 is screwed. In the substrate fixing unit 47b, two screw holes 47c configured to fix the substrate 50 are formed (see FIG. 8).

The holding frame 48 is formed in a cylindrical shape. The holding frame 48 is arranged so that an axial direction of the holding frame 48 coincides with the front-rear direction. As illustrated in FIG. 7, an inner peripheral side of the rear end of the holding frame 48 is a housing unit 48a in which the substrate fixing unit 47b is housed.

A portion at an inner peripheral side of the holding frame 48 and at a front side relative to the housing unit 48a is a housing unit 48b in which a rear end side portion of the adjustment ring 49 and the barrel holding unit 47a are housed. An inner peripheral surface of the housing unit 48b is a cylindrical surface. An inner diameter of the housing unit 48b is substantially equal to an outer diameter of the barrel holding unit 47a.

At a rear end side of the holding frame 48, two screw holes 48c configured to fix the substrate 50 are formed (see FIG. 8). As illustrated in FIG. 8, at a front end side of the holding frame 48, two elongated holes 48d are formed with the perpendicular direction being a longitudinal direction. The elongated holes 48d are formed to penetrate in the front-rear direction. Into the elongated holes 48d, screws 56 configured to fix the holding frame 48 to the fixing frame 45 are inserted. At the front end side of the holding frame 48, two guide grooves 48e are formed with the perpendicular direction being the longitudinal direction (see FIG. 7). The convex portions 45b of the fixing frame 45 are engaged with the guide grooves 48e.

The adjustment ring 49 is formed in a stepped cylindrical shape and includes a large diameter 49a and a small diameter 49b having an inner diameter and a outer diameter smaller than those of the large diameter 49a. The adjustment ring 49 is arranged so that an axial direction of the adjustment ring 49 coincides with the front-rear direction. The small diameter 49b configures the rear end side portion of the adjustment ring 49. The rear end side portion of the large diameter 49a and the small diameter 49b are housed in the housing unit 48b of the holding frame 48. The outer diameter of the large diameter 49a is substantially equal to the inner diameter of the housing unit 48b.

A gear 49c is formed on an outer peripheral surface at a front end side of the large diameter 49a. Further, the adjustment ring 49 is biased rearward by a compression coil spring 57. At a rear end of the small diameter 49b, an engaging projection to be engaged with an engaging concave portion formed on a front end surface of the lens barrel 46 is formed. A state of engagement between the engaging concave portion and the engaging projection is maintained by a biasing force of the compression coil spring 57. In the present embodiment, when the gear 49c is rotated to rotate the adjustment ring 49, the lens barrel 46, which is being rotated with respect to the barrel holder 47, moves in the front-rear direction.

The substrate 50 is formed in a substantially square flat plate shape. The substrate 50 is arranged so that a thickness direction of the substrate 50 coincides with the front-rear direction. The imaging element 8 is mounted on a front surface of the substrate 50. As illustrated in FIG. 8, two elongated holes 50a penetrating in the front-rear direction are formed in the substrate 50. The elongated holes 50a are formed in an arc shape where a center of the imaging element 8 serves as a center of curvature when viewed from the front-rear direction. Alternatively, a longitudinal direction of the elongated holes 50a is a tangential direction of an imaginary circle where a center of the imaging element 8 serves as a center of curvature when viewed from the front-rear direction. Further, two through holes 50b penetrating in the front-rear direction are formed in the substrate 50.

Into the elongated holes 50a, screws 58 configured to fix the substrate 50 to the holding frame 48 are inserted.

Into the through holes 50b, screws 59 configured to fix the substrate 50 to the barrel holder 47 are inserted.

In the present embodiment, after the substrate 50 on which the imaging element 8 is mounted is fixed to the barrel holder 47 by the screws 59, the substrate 50 with the barrel holder 47 is fixed to the holding frame 48 by the screws 58. A front surface of the substrate 50 is in contact with a rear end surface of the barrel holder 47 and a rear end surface of the holding frame 48.

The lower frame 52 is fixed to side plates 61 arranged inside the housing 10. The side plate 61 is arranged on each of both left and right end sides inside the housing 10, and two side plates 61 are arranged inside the housing 10. The side plate 61 and the housing 10 are fixed to each other. The reflection mirrors 30, 31 are fixed to the lower frame 52. As described above, the reflection mirrors 30, 31 are fixed to the housing 10 via the lower frame 52 and the side plate 61, and in a first optical path length direction being an optical path length direction of the light heading toward the imaging element 8 after being reflected by the back side of the information recording medium 2 placed on the glass plate 3, the reflection mirrors 30, 31 are fixed.

The upper frame 53 is fixed to the two side plates 61. Further, the upper frame 53 is fixed to the side plates 61 by screws (not illustrated). A position of the upper frame 53 can be adjusted in the perpendicular direction with respect to the side plates 61. Specifically, as illustrated in FIG. 9, a plurality of screw holes 53a configured to fix the upper frame 53 to the side plates 61 are formed in the upper frame 53, and a plurality of elongated holes 61a into which screws to be screwed into the screw holes 53a are inserted are formed in the side plates 61. The elongated holes 61a are elongated holes whose longitudinal direction is the perpendicular direction.

As illustrated in FIG. 9, a guide shaft 62 is fixed to the upper frame 53, and a guide shaft 63 is fixed to the side plate 61. The guide shafts 62, 63 are arranged so that axial directions of the guide shafts 62, 63 coincide with the left-right direction. A guide groove 61b with which the guide shaft 62 is engaged is formed in the side plate 61, and a guide groove 53b with which the guide shaft 63 is engaged is formed in the upper frame 53. The guide grooves 53b, 61b are formed in a U-shaped groove whose longitudinal direction is the perpendicular direction. The guide shafts 62, 63 and the guide grooves 53b, 61b serve to guide the upper frame 53 in the perpendicular direction when the perpendicular position of the upper frame 53 with respect to the side plate 61 is adjusted.

It is noted that the upper frame 53 includes a first frame 64 configured to hold the reflection mirror 33, a second frame 65 configured to hold the reflection mirror 34, and a common frame 66 to which the first frame 64 and the second frame 65 are fixed. The common frame 66 is fixed to the side plate 61.

The reflection mirror 33 is fixed to the upper frame 53. That is, the reflection mirror 33 is fixed to the upper frame 53 while being inclined by a predetermined angle with respect to the perpendicular direction. Specifically, the reflection mirror 33 is directly fixed to the first frame 64 while being inclined by 45° with respect to the perpendicular direction.

The reflection mirror 34 is fixed to a mirror fixing frame 68. The mirror fixing frame 68 is attached to the upper frame 53. Specifically, the mirror fixing frame 68 is attached to the second frame 65. The second frame 65 includes an inclined portion 65a inclined by approximately 45° with respect to the perpendicular direction. The inclined portion 65a is formed in a flat plate shape and is inclined downward toward a rear side. A through hole 65b in which a mirror fixing unit 68a (described later) included in the mirror fixing frame 68 is arranged is formed in the inclined portion 65a (see FIG. 11).

In addition, the second frame 65 includes a frame fixing unit 65c to which the mirror fixing frame 68 is fixed. The frame fixing unit 65c is formed to rise obliquely upward and rearward from the inclined portion 65a. In addition, the frame fixing unit 65c is formed in a flat plate shape, and is arranged so that a thickness direction of the frame fixing unit 65c coincides with the left-right direction. In the frame fixing unit 65c, screw holes 65d configured to fix the mirror fixing frame 68 are formed. The screw holes 65d are formed at two places, that is, a front upper end side and a rear lower end side of the frame fixing unit 65c. At a rear lower end of the frame fixing unit 65c, a notch 65e cut out diagonally upward and forward is formed. A width of an opening portion (rear lower end portion) of the notch 65e is narrower.

The mirror fixing frame 68 includes a mirror fixing unit 68a to which the reflection mirror 34 is fixed and a fixed unit 68b to be fixed to the frame fixing unit 65c. The mirror fixing unit 68a is formed in a flat plate shape and is formed in a substantially rectangular frame shape. The mirror fixing unit 68a is arranged in the through hole 65b of the second frame 65. The fixed units 68b are formed at two places, that is, a front upper end and a rear lower end of the mirror fixing unit 68a. Further, the fixed units 68b are formed to rise obliquely upward and rearward from the mirror fixing unit 68a. The fixed units 68b are formed in a flat plate shape and are arranged so that a thickness direction of the fixed units 68b coincides with the left-right direction.

The reflection mirror 34 is fixed to a top surface of the mirror fixing unit 68a. Flat springs 69 are fixed to the mirror fixing unit 68a by a rivet 70. The flat springs 69 are fixed to two positions at both left and right end sides of the mirror fixing unit 68a. Further, the flat springs 69 are fixed at a substantially center position of the mirror fixing unit 68a in the front-rear direction and the perpendicular direction. The flat springs 69 are arranged outside in the left-right direction with respect to the reflection mirror 34 and are fixed to a top surface of the mirror fixing unit 68a to spread toward both the left and right sides of the mirror fixing unit 68a. Further, the plate springs 69 are fixed to a top surface of the inclined portion 65a by a rivet 71. When viewed from the left-right direction, the rivet 70 and the rivet 71 overlap. As illustrated in FIG. 12, a position where the flat springs 69 are fixed by the rivet 71 substantially coincides with a position where the optical axis of the light entering on the reflection mirror 34 enters when viewed from the left-right direction.

An elongated hole 68c penetrating in the front-rear direction is formed in the fixed unit 68b. The elongated hole 68c is formed in an arc shape whose center of curvature is a position where the plate springs 69 are fixed by the rivet 70 when viewed from the left-right direction. Alternatively, a longitudinal direction of the elongated hole 68c is a tangential direction of an imaginary circle whose center of curvature is a center of a position where the plate springs 69 are fixed by the rivet 70 when viewed from the left-right direction. At a rear lower end of the fixed unit 68b arranged at a rear lower end side, the notch 68d cut out diagonally upward and forward is formed.

The mirror fixing frame 68 is fixed to the second frame 65 by a screw 72. The screw 72 is inserted through the elongated hole 68c and screwed into the screw hole 65d. Therefore, in the present embodiment, by deforming the flat springs 69 while the screw 72 is loosened, an inclination of the mirror fixing frame 68 with respect to the second frame 65 can be adjusted around the portion where the plate springs 69 are fixed by the rivet 71. That is, as illustrated in FIG. 12, the reflection mirror 34 to be fixed to the mirror fixing frame 68 is attached to the upper frame 53 so that an inclination angle of the reflection mirror 34 with respect to the perpendicular direction when viewed from the left-right direction can be adjusted. It is noted that in the present embodiment, when a tip end or the like of a flat-blade screwdriver is placed and gouged in the notches 65e, 68d while the screw 72 is slightly loosened, the inclination angle of the reflection mirror 34 with respect to the perpendicular direction can be fine-adjusted.

(Method of Adjusting Information Reading Device)

Figure 13A:
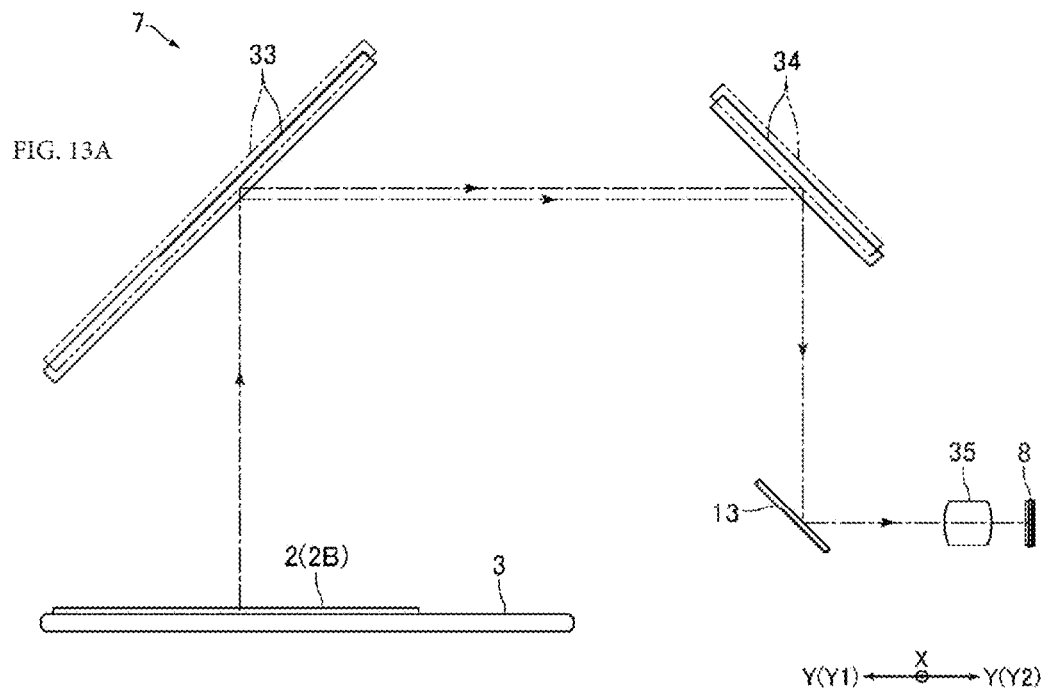
FIG. 13A and FIG. 13B are side views, where the former is a side view for explaining a principle of adjusting a focal position of light passing through a second optical system and an image-forming optical system illustrated in FIG. 4, and the latter is a side view for explaining a principle of adjusting a height of the light passing through the second optical system and the image-forming optical system illustrated in FIG. 4.
Figure 13B:
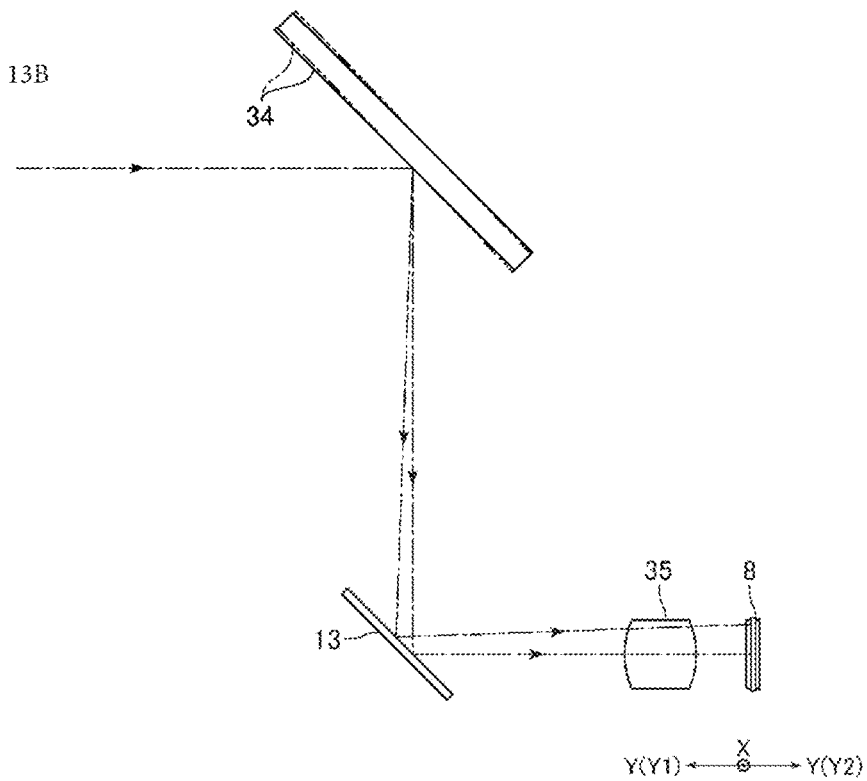

FIG. 13A is a side view for explaining a principle of adjusting a focal position of light passing through the optical system 7 and the image-forming optical system 9 illustrated in FIG. 4, and FIG. 13B is a side view for explaining a principle of adjusting a height of the light passing through the optical system 7 and the image-forming optical system 9 illustrated in FIG. 4.

The elongated hole 50a described above is formed in the substrate 50, and the substrate 50 is fixed to the holding frame 48 by the screws 58 to be inserted through the elongated hole 50a. Therefore, when the substrate 50 on which the imaging element 8 is mounted and the barrel holder 47 is fixed is rotated around the optical axis (that is, the optical axis of the image-forming lens 35) as a rotation axis, of the image-forming optical system 9 while the screws 59 are loosened, a position in the rotation direction of the imaging element 8 with the optical axis of the imaging optical system 9 as the rotation axis is adjusted. When adjusting the position of the imaging element 8 in the rotation direction, by an outer peripheral surface of the barrel holding unit 47a of the barrel holder 47 and an inner peripheral surface of the housing unit 48b of the holding frame 48, the substrate 50 is guided into the rotation direction of the imaging element 8.

Further, the holding frame 48 is formed with the aforementioned elongated hole 48d, and the holding frame 48 is fixed to the fixing frame 45 by the screw 56 to be inserted through the elongated hole 48d. Therefore, by moving the holding frame 48 to which the substrate 50 and the like are fixed in the perpendicular direction while the screw 56 is loosened, positions in the perpendicular direction of the image-forming optical system 9 (that is, the image-forming lens 35) and the imaging element 8 are adjusted. When adjusting the positions in the perpendicular direction of the image-forming optical system 9 and the imaging element 8, the holding frame 48 is guided into the perpendicular direction by the convex portion 45b of the fixing frame 45 and the guide groove 48e of the holding frame 48.

It is noted that as illustrated in FIG. 7, between an upper end of the convex portion 45b arranged at an upper side and an upper end of the guide groove 48e arranged at an upper side, and between a lower end of the convex portion 45b arranged at a lower side and a lower end of the guide groove 48e arranged at a lower side, a gap is formed. In the present embodiment, when a tip end or the like of a flat-blade screwdriver is placed and gouged in the gap while the screw 56 is slightly loosened, the position in the perpendicular direction of the image-forming optical system 9 and the imaging element 8 can be fine-adjusted.

Furthermore, as described above, when the gear 49c is rotated to rotate the adjustment ring 49, the lens barrel 46 moves in the front-rear direction while rotating with respect to the barrel holder 47, and thus, when the gear 49c is rotated, the position of the image-forming optical system 9 in the optical axis direction of the image-forming optical system 9 (specifically, the position of the image-forming lens 35) changes. Therefore, when the gear 49c is rotated to adjust the position of the image-forming optical system 9 in the optical axis direction of the image-forming optical system 9, the focal position of the light passing through the image-forming optical system 9 is adjusted.

Further, as described above, the upper frame 53 to which the reflection mirrors 33, 34 are attached can be adjusted in position in the perpendicular direction. When the upper frame 53 is adjusted in position in the perpendicular direction, as illustrated in FIG. 13A, the optical path length of the light heading toward the imaging element 8 after being reflected by the top side of the information recording medium 2 placed on the glass plate 3 changes, and the focal position of the light passing through the optical system 7 and the image-forming optical system 9 changes. That is, the reflection mirrors 33, 34 can be adjusted in position in the second optical path length direction being an optical path length direction of the light heading toward the imaging element 8 after being reflected by the top side of the information recording medium 2 placed on the glass plate 3, and when the upper frame 53 is adjusted in position in the perpendicular direction while the screws screwed into the screw holes 53a is loosened, the positions of the reflection mirrors 33, 34 in the second optical path length direction are adjusted. Further, when the positions of the reflection mirrors 33, 34 in the second optical path length direction are adjusted, the focal position of the light passing through the optical system 7 and the image-forming optical system 9 is adjusted.

Further, as described above, the reflection mirror 34 is attached to the upper frame 53 so that the inclination angle of the reflection mirror 34 with respect to the perpendicular direction can be adjusted. When the inclination angle of the reflection mirror 34 with respect to the perpendicular direction is changed, as illustrated in FIG. 13B, a position in the perpendicular direction of the light reaching the imaging element 8 after passing through the optical system 7 and the image-forming optical system 9 (position in the perpendicular direction of an image formed in the imaging element 8) is changed. Therefore, when the inclination angle of the reflection mirror 34 with respect to the perpendicular direction is adjusted, the position in the perpendicular direction of the light reaching the imaging element 8 after passing through the optical system 7 and the image-forming optical system 9 is adjusted.

It is noted that when the inclination angle of the reflection mirror 34 is adjusted, the reflection mirror 34 pivots about the position where the plate spring 69 is fixed by the rivet 71. Further, as described above, the position where the plate spring 69 is fixed by the rivet 71 when viewed from the left-right direction substantially coincides with the entering position of the optical axis of the light entering the reflection mirror 34. Therefore, even if the inclination angle of the reflection mirror 34 is adjusted, the optical path length of the light heading toward the imaging element 8 after being reflected by the top side of the information recording medium 2 placed on the glass plate 3 experiences substantially no change.

The adjustment of the information reading device 1 is performed according to the following procedure. Firstly, a position adjustment in the rotation direction of the imaging element 8 where the optical axis of the image-forming optical system 9 serves as the rotation axis, a position adjustment in the perpendicular direction of the image-forming optical system 9 and the imaging element 8, and a focal point adjustment for adjusting the focal position of the light passing through the optical system 6 and the imaging optical system 9 are performed (first adjustment step). In the first adjustment step, the back side of the information recording medium 2 placed on the glass plate 3 is irradiated with the light from the illuminator 4 while the shutter 37 is arranged at the second light-shielding position 37B. Further, in the first adjustment step, the focal point adjustment is performed by rotating the gear 49c.

After completion of the first adjustment step, the position of the upper frame 53 is adjusted in the perpendicular direction to adjust the positions of the reflection mirrors 33, 34 in the second optical path length direction, and the inclination angle of the reflection mirror 34 with respect to the perpendicular direction is adjusted (second adjustment step). In the second adjustment step, for example, after adjusting the positions of the reflection mirrors 33, 34 in the second optical path length direction, the inclination angle of the reflection mirror 34 with respect to the perpendicular direction is adjusted. That is, after adjusting the focal position of the light passing through the optical system 7 and the image-forming optical system 9, the position in the perpendicular direction of the light reaching the imaging element 8 after passing through the optical system 7 and the image-forming optical system 9 is adjusted.

(Operation of Reading the Information of Information Reading Device)

When the information recorded on the passport 2A is read by the information reading device 1, the passport 2A is placed on the glass plate 3 so that the rear surface of the cover on which the personal information is recorded faces downward. When the passport 2A is placed on the glass plate 3, the illuminator 4 irradiates the light, and the information recorded on the passport 2A is optically read. At this time, the shutter 37 is arranged at the second light-shielding position 37B. Further, the illuminator 5 does not irradiate light.

On the other hand, when the information recorded on the ID card 2B is read by the information reading device 1, once the ID card 2B is placed on the glass plate 3, firstly, the illuminator 4 irradiates the light and the information recorded on the back side of the ID card 2B is optically read. At this time, the shutter 37 is arranged at the second light-shielding position 37B, and the illuminator 5 does not irradiate light. When the information recorded on the back side of the ID card 2B is read, the shutter 37 moves to the first light-shielding position 37A and the illuminator 5 illuminates light, so that the information recorded on the top side of the ID card 2B is optically read. At this time, the illuminator 4 does not irradiate light.

It is noted that if the information recorded in the ID card 2B is read, the information recorded on the back side of the ID card 2B may be read after the information recorded on the top side of the ID card 2B is read. Further, if the information recorded on the ID card 2B is read, for example, the information recorded on the back side of the ID card 2B and the information recorded on the top side thereof are read in several tens of milliseconds.

Main Effect of Present Embodiment

As described above, in the present embodiment, the information reading device 1 includes the illuminator 4 configured to irradiate the back side of the information recording medium 2 placed on the glass plate 3, with the light, the illuminator 5 configured to irradiate the top side of the information recording medium 2 placed on the glass plate 3, with the light, the optical system 6 configured to read the information recorded on the back side of the information recording medium 2 placed on the glass plate 3, the optical system 7 configured to read the information recorded on the top side of the information recording medium 2 placed on the glass plate 3, and the image-forming optical system 9 configured to cause the light passing through the optical system 6 to form an image onto the imaging element 8 and cause the light passing through the optical system 8 to form an image on the imaging element 8.

Therefore, in the present embodiment, it is possible to optically read the information recorded on the both top and back sides of the ID card 2B while the ID card 2B is placed on the glass plate 3. Therefore, in the present embodiment, it is possible to simplify the operation of reading the information even if the information recorded on the both sides of the ID card 2B are read. Further, since the information recorded on the both top and back sides of the ID card 2B can be optically read while the ID card 2B is placed on the glass plate 3, it is possible to prevent an illegal act that, for example, after the information on one side of the ID card 2B is read by the imaging element 8, the information on the other side of the ID card 2B of another person is read by the imaging element 8. Therefore, in the present embodiment, it is possible to enhance the security even if the information recorded on both sides of the ID card 2B is read.

Further, in the present embodiment, it is possible to optically read the information recorded on the both top and back sides of the ID card 2B by using the single imaging element 8, as compared with a case where the imaging element configured to read the information recorded on the top side of the ID card 2B and the imaging element configured to read the information recorded on the back side of the ID card 2B are arranged separately, it is possible to simplify the configuration of the information reading device 1.

In the present embodiment, the information reading device 1 includes the beam splitter 13 configured to transmit a part of the light passing through the optical system 6 toward the image-forming optical system 9 and to reflect a part of the light passing through the optical system 7 toward the imaging optical system 9, and when the beam splitter 13 fixed to the fixing frame 45 is used to guide the light passing through the optical systems 6, 7 to the image-forming optical system 9.

Therefore, in the present embodiment, for example, as compared with a case where the reflection mirror is pivoted at the position at which the light passing through the optical system 6 is passed toward the image-forming optical system 9 and at the position at which the light passing through the optical system 7 is reflected toward the image-forming optical system 9 to guide the light passing through the optical systems 6, 7 to the image-forming optical system 9, it is possible to stabilize the optical path of the light heading toward the imaging optical system 9. Therefore, in the present embodiment, it is possible to improve the accuracy in reading the information recorded on the information recording medium 2.

In the present embodiment, when the information recorded on the back side of the information recording medium 2 placed on the glass plate 3 is read, the illuminator 4 irradiates light while the illuminator 5 does not irradiate light, and when the information recorded on the top side of the information recording medium 2 placed on the glass plate 3 is read, the illuminator 5 illuminates light while the illuminator 4 does not illuminate light. Therefore, in the present embodiment, when the information recorded on the back side of the information recording medium 2 is read, it becomes possible to eliminate an influence of the light irradiated from the illuminator 5 and reflected by the top side of the information recording medium 2, and when the information recorded on the top side of the information recording medium 2 is read, it becomes possible to eliminate an influence of the light irradiated from the illuminator 4 and reflected by the back side of the information recording medium 2. Therefore, in the present embodiment, it is possible to further improve the accuracy in reading the information recorded on the information recording medium 2.

In the present embodiment, the information reading device 1 includes the shutter mechanism 14 configured to shield the light entering the beam splitter 13 from the optical system 7 when the information recorded on the back side of the information recording medium 2 placed on the glass plate 3 is read and shield the light entering the beam splitter 13 from the optical system 6 when the information recorded on the top side of the information recording medium 2 placed on the glass plate 3 is read.

Therefore, in the present embodiment, it is possible to eliminate an influence of ambient light reflected by the top side of the information recording medium 2 when the information recorded on the back side of the information recording medium 2 is read, and it is possible to eliminate an influence of ambient light reflected by the back side of the information recording medium 2 when the information recorded on the top side of the information recording medium 2 is read. Therefore, in the present embodiment, it is possible to further improve the accuracy in reading the information recorded on the information recording medium 2.

In the present embodiment, the shutter mechanism 14 includes the shutter 37 movable between the first light-shielding position 37A for shielding the optical path between the optical system 6 and the beam splitter 13 and the second light-shielding position 37B for shielding the optical path between the optical system 7 and the beam splitter 13, and the shutter drive mechanism 38 configured to move the shutter 37 between the first light-shielding position 37A and the second light-shielding position 37B. Therefore, in the present embodiment, as compared with a case where the shutter configured to shield the optical path between the optical system 6 and the beam splitter 13 and the shutter configured to shield the optical path between the optical system 7 and the beam splitter 13 are separately provided, it is possible to simplify the configuration of the information reading device 1.

In the present embodiment, an optical path length of the light reflected by the back side of the information recording medium 2 placed on the glass plate 3 up to the imaging element 8 and an optical path length of the light reflected by the top side of the information recording medium 2 placed on the glass plate 3 up to the imaging element 8 are substantially equal. Therefore, in the present embodiment, the information on the back side of the information recording medium 2 placed on the glass plate 3 and the information on the top side of the information recording medium 2 placed on the glass plate 3 can be imaged at the same magnification.

In the present embodiment, the information reading device 1 includes the camera 18 arranged at a front side and an upper side of the information reading device 1. Therefore, in the present embodiment, for example, the information reading device 1 can capture a face of an owner of the information recording medium 2 who performs an operation of reading the information recording medium 2. Therefore, for example, when the face photo information of the information recording medium 2 read by the imaging element 8 is checked with the face photo captured by the camera 18, it is possible to determine whether the owner of the information recording medium 2 is a genuine owner. Further, for example, when an operator holds a mobile terminal displaying a barcode or the like over the camera 18, it is possible to read the information displayed on the portable terminal.

In the present embodiment, the reflection mirrors 33, 34 can be adjusted in position in the second optical path length direction being an optical path length direction of the light heading toward the imaging element 8 after being reflected by the top side of the information recording medium 2 placed on the glass plate 3. Therefore, in the present embodiment, even if it is possible to read the information recorded on the both top and back sides of the information recording medium 2 with the single imaging element 8, it is possible to appropriately set the optical path length of the light heading toward the imaging element 8 after being reflected by the back side of the information recording medium 2 and the optical path length of the light heading toward the imaging element after being reflected by the top side of the information recording medium 2.

In other words, in the present embodiment, even if it is possible to optically read the information recorded on the both top and back sides of the information recording medium 2 with the single imaging element 8, it is possible to appropriately set the focal position of the light passing through the optical system 6 and the image-forming optical system 9 and the focal position of the light passing through the optical system 7 and the image-forming optical system 9. Therefore, in the present embodiment, even if it is possible to optically read the information recorded on the both top and back sides of the information recording medium 2 with the single imaging element 8, it is possible to improve the accuracy in reading the information recorded on the both top and back sides of the information recording medium 2.

On the other hand, in the present embodiment, the reflection mirrors 30, 31 are fixed in the first optical path length direction being the optical path length direction of the light heading toward the imaging element 8 after being reflected by the back side of the information recording medium 2 placed on the glass plate 3, and the position adjustment task, in the first optical path length direction, of the reflection mirrors 30, 31 is not necessary.

Further, in the present embodiment, in the first adjustment step, with reference to the reflection mirrors 30, 31 fixed in the first optical path length direction, a position adjustment in the rotation direction of the imaging element 8 where the optical axis of the image-forming optical system 9 serves as the rotation axis, a position adjustment in the perpendicular direction of the image-forming optical system 9 and the imaging element 8, and a focal point adjustment for adjusting the focal position of the light passing through the optical system 6 and the imaging optical system 9 are performed, and thereafter, in the second adjustment step, the reflection mirrors 33, 34 are moved in the perpendicular direction to adjust the focal position of the light passing through the optical system 7 and the image-forming optical system 9, and the inclination angle of the reflection mirror 34 with respect to the perpendicular direction is adjusted to adjust the position in the perpendicular direction of the light reaching the imaging element 8 after passing through the optical system 7 and the image-forming optical system 9.

Therefore, in the present embodiment, even if the second adjustment step is performed after the first adjustment step, there occur no deviation in the adjustment place adjusted in the first adjustment step. Therefore, in the present embodiment, even if it is possible to optically read the information recorded on the both top and back sides of the information recording medium 2 with a single imaging element 8, the adjustment task of the information reading device 1 can be simplified.

Further, in the present embodiment, when the position of the upper frame 53 is adjusted in the perpendicular direction, the positions of the reflection mirrors 33, 34 in the second optical path length direction are adjusted (that is, because the focus position of the light passing through the optical system 7 and the image-forming optical system 9 is adjusted), it is possible to perform the position adjustment task of the reflection mirror 33 in the second optical path length direction and the position adjustment task of the reflection mirror 34 at the same time. Therefore, in the present embodiment, it is possible to simplify the adjustment task of the focal position of the light passing through the optical system 7 and the image-forming optical system 9.

Other Embodiments

The above-described embodiment is one possible embodiment of the present invention, but the present invention is not limited thereto, and various modifications can be made without changing the gist of the present invention.

In the above-described embodiment, the shutter configured to shield the light entering the beam splitter 13 from the optical system 6 and the shutter configured to shield the light entering the beam splitter 13 from the optical system 7 may be separately provided. In this case, the shutter may be placed in an optical path between the reflection mirror 30 and the reflection mirror 31, or in an optical path between the reflection mirror 31 and the reflection mirror 32, and the shutter may be placed in an optical path between the reflection mirror 33 and the reflection mirror 34.

Further, in the above-described embodiment, as long as the information reading device 1 is installed at a place where the influence of the ambient light is not easily received, the information reading device 1 may not include the shutter mechanism. Further, in the above-described embodiment, when the information recorded on the back side of the information recording medium 2 mounted on the glass plate 3 is read, the illuminator 5 may irradiate light, and when the information recorded on the top side of the information recording medium 2 mounted on the glass plate 3 is read, the illuminator 4 may irradiate light.

In the above-described embodiment, in place of the beam splitter 13, the reflection mirror which can pivot may be provided at the position at which the light passing through the optical system 6 is passed toward the image-forming optical system 9 and at the position at which the light passing through the optical system 7 is reflected toward the image-forming optical system 9. Similarly to, for example, a reflection mirror of a single lens reflex camera, this reflection mirror pivots by 45° with the left-right direction as the axial direction in pivoting. In this case, it is possible to increase an amount of light reaching the imaging element 8 compared to that in the above-described embodiment. Further, in this case, the shutter mechanism 14 becomes unnecessary.

In the above-described embodiment, the reflection mirror 34 may be fixed directly to the upper frame 53, and the reflection mirror 33 may be attached to the upper frame 53 so that the inclination angle of the reflection mirror 33 with respect to the perpendicular direction can be adjusted. Further, the reflection mirror 34 may be attached to the upper frame 53 so that the inclination angle of the reflection mirror 34 with respect to the perpendicular direction can be adjusted, and the reflection mirror 33 may be attached to the upper frame 53 so that the inclination angle of the reflection mirror 33 with respect to the perpendicular direction can be adjusted.

In the above-described embodiment, when the reflection mirror 33 and the reflection mirror 34 are moved in the perpendicular direction, the focal position of the light passing through the optical system 7 and the image-forming optical system 9 is adjusted; however, the reflection mirror 33 only may be moved in the perpendicular direction to adjust the focal position of the light passing through the optical system 7 and the image-forming optical system 9, and the reflection mirror 34 only may be moved in the perpendicular direction to adjust the focal position of the light passing through the optical system 7 and the image-forming optical system 9. That is, the reflection mirror 33 only may be adjustable in position in the second optical path length direction, or the reflection mirror 34 only may be adjustable in position in the second optical path length direction.

Further, in the above-described embodiment, it may be possible that when at least one of the reflection mirror 33 and the reflection mirror 34 is pivoted while the upper end side or the lower end side of the reflection mirrors 33, 34 serves as the pivoting center and the left-right direction serves as the axial direction in pivoting, the focal position of the light passing through the optical system 7 and the image-forming optical system 9 may be adjusted. That is, when at least one of the reflection mirror 33 and the reflection mirror 34 is pivoted, the position in the second optical path length direction of at least one of the reflection mirror 33 and the reflection mirror 34 may be adjusted.

In addition, in the above-described embodiment, instead of the feature that the reflection mirrors 33, 34 can be adjusted in position in the second optical path length direction, or in addition to the feature that the reflection mirrors 33, 34 can be adjusted in position in the second optical path length direction, at least one of the reflection mirror 30 and the reflection mirror 31 may be adjustable in position in the first optical path length direction.

In the above-described embodiment, the optical systems 6, 7 may be configured so that the beam splitter 13 reflects a part of the light passing through the optical system 6 toward the image-forming optical system 9 and transmits a part of the light passing through the optical system 7 toward the imaging optical system 9. In this case, for example, the optical system 6 includes two reflection mirrors, and the optical system 7 includes three reflection mirrors. Further, the number of reflection mirrors provided in the optical systems 6, 7 may be four or more.

In the above-described embodiment, the information reading device 1 may include a pivoting mechanism configured to pivot the camera 18 by 180° with the perpendicular direction as the axial direction in pivoting. With such a configuration, for example, even if an operator operating the information reading device 1 is different from a holder of the information recording medium 2 and the operator and the holder are facing each other, it is possible to determine whether the holder of the information recording medium 2 is a genuine owner by checking the face photo information of the information recording medium 2 read by the imaging element 8 with the face photo captured by the camera 18.

In the above-described embodiment, the information reading device 1 may include a transparent resin plate such as an acrylic plate instead of the glass plate 3. Further, in the above-described embodiment, the IC chip may not be built in the information recording medium 2. In this case, the antenna and the antenna 17 arranged under the glass plate 3 are unnecessary. Further, in the above-described embodiment, the information recording medium 2 may be a medium other than the passport 2A and the ID card 2B. For example, the information recording medium 2 may be a driver's license. In the above-described embodiment, the information reading device 1 is a manual reader; however, the information reading device to which the configuration of at least an embodiment of the present invention is applied may be a medium conveying type reader having a mechanism of conveying an information recording medium.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

The invention claimed is:

1. An information reading device for optically reading information recorded on an information recording medium, the information reading device comprising:
an imaging element;
a transparent placing member on which the information recording medium is placed;
a first illuminator configured to irradiate a back side of the information recording medium placed on the placing member, with light;
a second illuminator configured to irradiate a top side of the information recording medium placed on the placing member, with light;
a first optical system configured to read information recorded on the back side of the information recording medium placed on the placing member; a second optical system configured to read information recorded on the top side of the information recording medium placed on the placing member; and
an image-forming optical system configured to cause light passing through the first optical system to form an image onto the imaging element and cause light passing through the second optical system to form an image on the imaging element;
wherein the first optical system comprises a reflection mirror arranged below the placing member,
the second optical system comprises a reflection mirror arranged above the information recording medium placed on the placing member,
at least one of the reflection mirror comprised in the first optical system and the reflection mirror comprised in the second optical system is adjustable in position in an optical path length direction of light heading toward the imaging element after being reflected by the information recording medium placed on the placing member,
the second optical system comprises, as the reflection mirror, a first reflection mirror configured to receive the light reflected by the top side of the information recording medium placed on the placing member, and a second reflection mirror configured to receive the light reflected by the first reflection mirror,
the reflection mirror comprised in the first optical system is fixed in a first optical path length direction being an optical path length direction of light heading toward the imaging element after being reflected by the back side of the information recording medium placed on the placing member, and
at least one of the first reflection mirror and the second reflection mirror is adjustable in position in a second optical path length direction being an optical path length direction of light heading toward the imaging element after being reflected by the top side of the information recording medium placed on the placing member.

2. The information reading device according to claim 1, comprising
a beam splitter configured to cause a part of the light passing through one of the first optical system and the second optical system to transmit toward the image-forming optical system, and to reflect a part of the light passing through the other of the first optical system and the second optical system toward the image-forming optical system.

3. The information reading device according to claim 2, comprising
a shutter mechanism configured to shield the light entering the beam splitter from the second optical system when the information recorded on the back side of the information recording medium placed on the placing member is read, and to shield the light entering the beam splitter from the first optical system when the information recorded on the top side of the information recording medium placed on the placing member is read.

4. The information reading device according to claim 3, wherein
the shutter mechanism comprises a shutter movable between a first light-shielding position for shielding the optical path between the first optical system and the beam splitter and a second light-shielding position for shielding the optical path between the second optical system and the beam splitter, and a shutter drive mechanism configured to move the shutter between the first light-shielding position and the second light-shielding position.

5. The information reading device according to claim 4, comprising:
a mirror holding member configured to hold the first reflection mirror and the second reflection mirror, wherein:
the mirror holding member is adjustable in position in the perpendicular direction, and
when the mirror holding member is adjusted in position in the perpendicular direction, the first reflection mirror and the second reflection mirror are adjusted in position in the second optical path length direction.

6. The information reading device according to claim 5, wherein:
the first reflection mirror is fixed to the mirror holding member while being inclined at a predetermined angle with respect to the perpendicular direction; and
the second reflection mirror is attached to the mirror holding member so that an inclination angle of the second reflection mirror with respect to the perpendicular direction is adjustable.

7. The information reading device according to claim 1, wherein:
when the information recorded on the back side of the information recording medium placed on the placing member is read, the first illuminator irradiates the light while the second illuminator does not irradiate the light, and
when the information recorded on the top side of the information recording medium placed on the placing member is read, the second illuminator irradiates the light while the first illuminator does not irradiate the light.

8. The information reading device according to claim 7, wherein
an optical path length to the imaging element, of the light reflected by the back side of the information recording medium placed on the placing member, and an optical path length to the imaging element, of the light reflected by the top side of the information recording medium placed on the placing member, are substantially equal.

9. The information reading device according to claim 8, comprising
a camera arranged on a front side and an upper side of the information reading device.

10. The information reading device according to claim 9, comprising
a mirror holding member configured to hold the first reflection mirror and the second reflection mirror, wherein
the mirror holding member is adjustable in position in the perpendicular direction, and
when the mirror holding member is adjusted in position in the perpendicular direction, the first reflection mirror and the second reflection mirror are adjusted in position in the second optical path length direction.

11. The information reading device according to claim 10, wherein:
the first reflection mirror is fixed to the mirror holding member while being inclined at a predetermined angle with respect to the perpendicular direction, and
the second reflection mirror is attached to the mirror holding member so that an inclination angle of the second reflection mirror with respect to the perpendicular direction is adjustable.

12. The information reading device according to claim 1, wherein
an optical path length to the imaging element, of the light reflected by the back side of the information recording medium placed on the placing member, and an optical path length to the imaging element, of the light reflected by the top side of the information recording medium placed on the placing member, are substantially equal.

13. The information reading device according to claim 12, comprising
a mirror holding member configured to hold the first reflection mirror and the second reflection mirror, wherein:
the mirror holding member is adjustable in position in the perpendicular direction, and
when the mirror holding member is adjusted in position in the perpendicular direction, the first reflection mirror and the second reflection mirror are adjusted in position in the second optical path length direction.

14. The information reading device according to claim 13, wherein:
the first reflection mirror is fixed to the mirror holding member while being inclined at a predetermined angle with respect to the perpendicular direction, and
the second reflection mirror is attached to the mirror holding member so that an inclination angle of the second reflection mirror with respect to the perpendicular direction is adjustable.

15. The information reading device according to claim 1, comprising
a camera arranged on a front side and an upper side of the information reading device.

16. The information reading device according to claim 15, comprising
a mirror holding member configured to hold the first reflection mirror and the second reflection mirror, wherein
the mirror holding member is adjustable in position in the perpendicular direction, and
when the mirror holding member is adjusted in position in the perpendicular direction, the first reflection mirror and the second reflection mirror are adjusted in position in the second optical path length direction.

17. The information reading device according to claim 16, wherein:
the first reflection mirror is fixed to the mirror holding member while being inclined at a predetermined angle with respect to the perpendicular direction, and
the second reflection mirror is attached to the mirror holding member so that an inclination angle of the second reflection mirror with respect to the perpendicular direction is adjustable.

18. The information reading device according to claim 1, comprising:
a mirror holding member configured to hold the first reflection mirror and the second reflection mirror; wherein
the mirror holding member is adjustable in position in the perpendicular direction; and
when the mirror holding member is adjusted in position in the perpendicular direction, the first reflection mirror and the second reflection mirror are adjusted in position in the second optical path length direction.

19. The information reading device according to claim 18, wherein:
the first reflection mirror is fixed to the mirror holding member while being inclined at a predetermined angle with respect to the perpendicular direction; and
the second reflection mirror is attached to the mirror holding member so that an inclination angle of the second reflection mirror with respect to the perpendicular direction is adjustable.

20. A method of adjusting an information reading device for optically reading information recorded on an information recording medium, the information reading device comprising:
an imaging element;
a transparent placing member on which the information recording medium is placed; a first illuminator configured to irradiate a back side of the information recording medium placed on the placing member, with light;
a second illuminator configured to irradiate a top side of the information recording medium placed on the placing member, with light;
a first optical system configured to read information recorded on the back side of the information recording medium placed on the placing member;
a second optical system configured to read information recorded on the top side of the information recording medium placed on the placing member; and
an image-forming optical system configured to cause light passing through the first optical system to form an image onto the imaging element and cause light passing through the second optical system to form an image on the imaging element, wherein
the first optical system comprises a reflection mirror arranged below the placing member,
the second optical system comprises a reflection mirror arranged above the information recording medium placed on the placing member,
at least one of the reflection mirror comprised in the first optical system and the reflection mirror comprised in the second optical system is adjustable in position in an optical path length direction of light heading toward the imaging element after being reflected by the information recording medium placed on the placing member,
the second optical system comprises, as the reflection mirror, a first reflection mirror configured to receive the light reflected by the top side of the information recording medium placed on the placing member, and a second reflection mirror configured to receive the light reflected by the first reflection mirror,
the reflection mirror comprised in the first optical system is fixed in a first optical path length direction being an optical path length direction of light heading toward the imaging element after being reflected by the back side of the information recording medium placed on the placing member,
at least one of the first reflection mirror and the second reflection mirror is adjustable in position in a second optical path length direction being an optical path length direction of light heading toward the imaging element after being reflected by the top side of the information recording medium placed on the placing member,
a mirror holding member configured to hold the first reflection mirror and the second reflection mirror is provided,
the mirror holding member is adjustable in position in the perpendicular direction,
when the mirror holding member is adjusted in position in the perpendicular direction, the first reflection mirror and the second reflection mirror are adjusted in position in the second optical path length direction,
the first reflection mirror is fixed to the mirror holding member while being inclined at a predetermined angle with respect to the perpendicular direction, and
the second reflection mirror is attached to the mirror holding member so that an inclination angle of the second reflection mirror with respect to the perpendicular direction is adjustable, wherein the method comprises:
a first adjustment step of adjusting the imaging element in position in a rotation direction where an optical axis of the image-forming optical system serves as a rotation axis, adjusting the image-forming optical system and the imaging element in position in the perpendicular direction, and adjusting a focal point wherein a focal position of the light passing through the first optical system and the image-forming optical system is adjusted by adjusting the image-forming optical system in position in the optical axial direction of the image-forming optical system; and
a second adjustment step, after the first adjustment step, of adjusting the mirror holding member in position in the perpendicular direction to adjust the first reflection mirror and the second reflection mirror in position in the second optical path length direction, and adjusting the inclination angle of the second reflection mirror with respect to the perpendicular direction.

* * * * *